(12) United States Patent
Zheng et al.

(10) Patent No.: US 9,839,030 B2
(45) Date of Patent: Dec. 5, 2017

(54) METHOD AND DEVICE FOR GENERATING SUBFRAME, METHOD FOR DETERMINING SUBFRAME AND USER EQUIPMENT

(71) Applicant: Huawei Technologies Co., Ltd., Shenzhen, Guangdong (CN)

(72) Inventors: Juan Zheng, Beijing (CN); Chaojun Li, Beijing (CN); Sha Ma, Beijing (CN); Qiang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 14/831,684

(22) Filed: Aug. 20, 2015

(65) Prior Publication Data

US 2015/0358966 A1 Dec. 10, 2015

Related U.S. Application Data

(63) Continuation of application No. PCT/CN2013/071790, filed on Feb. 22, 2013.

(51) Int. Cl.
*H04W 72/04* (2009.01)
*H04W 74/00* (2009.01)
*H04L 5/00* (2006.01)
*H04B 7/26* (2006.01)

(52) U.S. Cl.
CPC ...... *H04W 72/0446* (2013.01); *H04B 7/2656* (2013.01); *H04L 5/0048* (2013.01); *H04W 74/006* (2013.01)

(58) Field of Classification Search
CPC .................................................. H04W 72/0446
See application file for complete search history.

(56) References Cited

U.S. PATENT DOCUMENTS

| | | | |
|---|---|---|---|
| 8,855,080 B2 * | 10/2014 | Chen | H04W 16/14 370/252 |
| 2009/0073902 A1 * | 3/2009 | Astely | H04B 7/2656 370/280 |
| 2010/0238845 A1 * | 9/2010 | Love | H04B 7/15528 370/280 |

(Continued)

FOREIGN PATENT DOCUMENTS

| CN | 101102525 A | 1/2008 |
|---|---|---|
| CN | 101197615 A | 6/2008 |

(Continued)

OTHER PUBLICATIONS

"Air interface synchronization for small cells", CATT, 3GPP TSG RAN WG1 Meeting #74, Aug. 19-23, 2013, 3 pages, R1-133025.

(Continued)

*Primary Examiner* — Parth Patel

(57) ABSTRACT

This application provides a method and device for generating a subframe, a method for determining a subframe and a user equipment. The method for generating a subframe includes: determining, by a first device, patterns of at least two special subframes used in a broadcast control channel modification period, where guard period GP durations of the at least two special subframes are different; and generating, by the first device, the at least two special subframes. The method enhances flexibility and improves a system resource utilization rate.

16 Claims, 6 Drawing Sheets

(56) References Cited

U.S. PATENT DOCUMENTS

| | | | | |
|---|---|---|---|---|
| 2010/0246456 | A1* | 9/2010 | Suo | H04B 7/2656 370/280 |
| 2010/0278080 | A1* | 11/2010 | Pan | H04B 7/2656 370/280 |
| 2011/0164604 | A1* | 7/2011 | Hao | H04L 27/2626 370/345 |
| 2011/0243107 | A1 | 10/2011 | Koivisto et al. | |
| 2011/0317597 | A1* | 12/2011 | Wan | H04W 72/1289 370/281 |
| 2012/0069778 | A1* | 3/2012 | Zhang | H04L 5/14 370/279 |
| 2012/0188877 | A1* | 7/2012 | Chin | H04W 24/10 370/241 |
| 2012/0309321 | A1* | 12/2012 | Agarwal | H04W 72/1252 455/67.11 |
| 2013/0039193 | A1* | 2/2013 | Yin | H04W 72/0486 370/252 |
| 2013/0136028 | A1* | 5/2013 | Gan | H04W 24/02 370/252 |
| 2013/0143614 | A1* | 6/2013 | Lee | H04W 52/146 455/509 |
| 2014/0064122 | A1* | 3/2014 | Chin | H04W 36/14 370/252 |
| 2014/0126432 | A1* | 5/2014 | Wang | H04B 7/2656 370/280 |
| 2014/0369243 | A1* | 12/2014 | Guo | H04W 56/0015 370/280 |
| 2015/0009870 | A1* | 1/2015 | Bashar | H04W 52/0251 370/280 |
| 2015/0043392 | A1* | 2/2015 | Susitaival | H04L 5/1469 370/280 |
| 2015/0215963 | A1* | 7/2015 | Zhu | H04L 5/14 370/280 |
| 2015/0215979 | A1* | 7/2015 | Nan | H04W 76/023 370/329 |
| 2015/0351117 | A1* | 12/2015 | Rahman | H04L 5/1469 370/252 |

FOREIGN PATENT DOCUMENTS

| | | |
|---|---|---|
| CN | 101227230 A | 7/2008 |
| CN | 101431363 A | 5/2009 |
| CN | 101651895 A | 2/2010 |
| CN | 102273243 A | 12/2011 |
| WO | WO 2011/085522 A1 | 7/2011 |
| WO | WO 2012/065287 A1 | 5/2012 |
| WO | WO 2012/119309 A1 | 9/2012 |

OTHER PUBLICATIONS

"Enhanced mechanisms for network listening", Huawei, HiSilicon, 3GPP TSG RAN WG1 Meeting #74bis, Oct. 7-11, 2013, 5 pages, R1-134067.

* cited by examiner

METHOD AND DEVICE FOR GENERATING SUBFRAME, METHOD FOR DETERMINING SUBFRAME AND USER EQUIPMENT

CROSS-REFERENCE TO RELATED APPLICATIONS

This application is a continuation of International Application No. PCT/CN2013/071790, filed on Feb. 22, 2013, which is hereby incorporated by reference in its entirety.

TECHNICAL FIELD

This application relates to the field of communications, and in particular, to a method and device for generating a subframe, a method for determining a subframe, and a user equipment.

BACKGROUND

In an existing LTE TDD (Long Term Evolution Time Division Duplexing, long term evolution time division duplexing) system, a radio frame includes a special subframe consisting of a DwPTS (Downlink Pilot Time Slot, downlink pilot time slot), a GP (Guard Period, guard period) and an UpPTS (Uplink Pilot Time Slot, uplink pilot time slot). The special subframe also has multiple ratios. Since a special subframe ratio is carried in a system broadcast message for notification, a change of the special subframe ratio depends on update time of the system broadcast message. At present, update time of a system broadcast message is at least several hundred milliseconds (for example, 320 ms, 640 ms, or 1280 ms). In this way, flexibility of the special subframe ratio configured based on the prior art is low. That is, the special subframe ratio remains unchanged at least in a time range of several hundred ms.

SUMMARY

In view of this, a method and device for generating a subframe, a method for determining a subframe, and a user equipment are provided, so as to resolve a problem of low flexibility in the prior art.

In a first aspect, a method for generating a subframe is provided and includes: determining, by a first device, patterns of at least two special subframes used in a broadcast control channel modification period, where guard period GP durations of the at least two special subframes are different; and generating, by the first device, the at least two special subframes.

In a first possible implementation manner of the first aspect, after determining, by the first device, the patterns of the at least two special subframes used in the broadcast control channel modification period, the method further includes: generating, by the first device, control information used to indicate the at least two special subframes, and transmitting, by the first device, the control information to a second device.

With reference to any of the foregoing possible implementation manners, in a second possible implementation manner of the first aspect, the control information includes: ratio patterns of the at least two special subframes and/or special subframe effective time.

With reference to any of the foregoing possible implementation manners, in a third possible implementation manner of the first aspect, the special subframe effective time includes: a special subframe position; or, a special subframe offset and period.

With reference to any of the foregoing possible implementation manners, in a fourth possible implementation manner of the first aspect, after the generating, by the first device, the at least two special subframes, the method further includes: receiving, by the first device, a signal by using a GP of a first special subframe in the at least two special subframes, and transmitting the signal by using a downlink pilot time slot in the first special subframe to transmit the signal.

With reference to any of the foregoing possible implementation manners, in a fifth possible implementation manner of the first aspect, after the receiving, by the first device, a signal by using a GP of a first special subframe in the at least two special subframes, the method further includes: performing, by the first device, synchronous tracking, energy detection, and/or signal parsing by using the received signal.

With reference to any of the foregoing possible implementation manners, in a sixth possible implementation manner of the first aspect, the receiving, by the first device, a signal by using a GP of a first special subframe in the at least two special subframes includes: receiving, by the first device, a synchronization signal by using the GP of the first special subframe; and transmitting, by the first device, the synchronization signal to a lower-level device by using a downlink subframe and/or a second special subframe in the at least two special subframes, where the GP duration of the first special subframe is larger than a GP duration of the second special subframe.

With reference to any of the foregoing possible implementation manners, in a seventh possible implementation manner of the first aspect, the determining, by a first device, patterns of at least two special subframes used in a broadcast control channel modification period includes: receiving, by the first device, first indication information transmitted by a third device, where the first indication information is used to indicate a special subframe used by the third device; and determining, by the first device, the patterns of the at least two special subframes according to the first indication information.

With reference to any of the foregoing possible implementation manners, in an eighth possible implementation manner of the first aspect, the determining, by the first device, the patterns of the at least two special subframes according to the first indication information includes: determining, by the first device, the special subframe used by the third device according to the first indication information; determining, by the first device, a pattern of the first special subframe in the at least two special subframes, where the GP duration of the first special subframe is larger than a GP duration of the special subframe used by the third device; and determining, by the first device, patterns of other special subframes except the first special subframe in the at least two special subframes, where a GP duration of at least one special subframe in the other special subframes is different from the GP duration of the first special subframe.

With reference to any of the foregoing possible implementation manners, in a ninth possible implementation manner of the first aspect, the determining, by a first device, patterns of at least two special subframes used in a broadcast control channel modification period includes: determining, by the first device, the patterns of the at least two special subframes used in the broadcast control channel modification period according to correspondence between a level of the first device and the patterns of the at least two special subframes.

With reference to any of the foregoing possible implementation manners, in a tenth possible implementation manner of the first aspect, the determining, by a first device, patterns of at least two special subframes used in a broadcast control channel modification period includes: receiving, by the first device, second indication information transmitted by a third device, where the second indication information is used to indicate a downlink subframe used by the third device; and determining, by the first device, the patterns of the at least two special subframes according to the second indication information.

With reference to any of the foregoing possible implementation manners, in an eleventh possible implementation manner of the first aspect, the determining, by the first device, the patterns of the at least two special subframes according to the second indication information includes: determining, by the first device, the downlink subframe used by the third device according to the second indication information; determining, by the first device, a pattern of the first special subframe in the at least two special subframes, where a determined GP duration of a special subframe is corresponding to a position of the downlink subframe used by the third device; and determining, by the first device, patterns of other special subframes except the first special subframe in the at least two special subframes, where a GP duration of at least one special subframe in the other special subframes is different from the GP duration of the first special subframe.

With reference to any of the foregoing possible implementation manners, in a twelfth possible implementation manner of the first aspect, the determining, by a first device, patterns of at least two special subframes used in a broadcast control channel modification period includes: determining, by the first device, the patterns of the at least two special subframes used in a first time period in the broadcast control channel modification period, where the first time period is a time period of a same uplink downlink subframe ratio.

With reference to any of the foregoing possible implementation manners, in a thirteenth possible implementation manner of the first aspect, the second device includes a user equipment, and/or, the first device includes a base station.

With reference to any of the foregoing possible implementation manners, in a fourteenth possible implementation manner of the first aspect, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

In a second aspect, a method for determining a subframe is provided and includes: receiving, by a user equipment, control information transmitted by a first device, where the control information is used to indicate at least two special subframes used by the first device in a broadcast control channel modification period, and guard period GP durations of the at least two special subframes are different; and determining, by the user equipment, the at least two special subframes according to the control information.

In a first possible implementation manner of the second aspect, the control information includes: ratio patterns of the at least two special subframes and/or special subframe effective time.

With reference to any of the foregoing possible implementation manners, in a second possible implementation manner of the second aspect, the special subframe effective time includes: a special subframe position; or, a special subframe offset and period.

With reference to any of the foregoing possible implementation manners, in a third possible implementation manner of the second aspect, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

In a third aspect, a device for generating a subframe is provided and includes: a processing unit and a transceiver unit, where the processing unit is configured to determine patterns of at least two special subframes used in a broadcast control channel modification period; guard period GP durations of the at least two special subframes are different; and the processing unit is further configured to generate the at least two special subframes.

In a first possible implementation manner of the third aspect, after determining the patterns of the at least two special subframes used in the broadcast control channel modification period, the processing unit is further configured to generate control information to indicate the at least two special subframes; and the transceiver unit is further configured to transmit the control information to a second device.

With reference to any of the foregoing possible implementation manners, in a second possible implementation manner of the third aspect, the control information includes: ratio patterns of the at least two special subframes and/or special subframe effective time.

With reference to any of the foregoing possible implementation manners, in a third possible implementation manner of the third aspect, the special subframe effective time includes: a special subframe position; or, a special subframe offset and period.

With reference to any of the foregoing possible implementation manners, in a fourth possible implementation manner of the fourth aspect, the transceiver unit is further configured to use a GP of a first special subframe in the at least two special subframes to receive a signal, and use a downlink pilot time slot in the first special subframe to transmit the signal.

With reference to any of the foregoing possible implementation manners, in a fifth possible implementation manner of the third aspect, after using the GP of the first special subframe in the at least two special subframes to receive the signal, the processing unit is further configured to use the received signal to perform synchronous tracking, energy detection, and/or signal parsing.

With reference to any of the foregoing possible implementation manners, in a sixth possible implementation manner of the third aspect, that the transceiver unit is configured to receive a signal by using a GP of a first special subframe in the at least two special subframes includes: receiving a synchronization signal by using the GP of the first special subframe; and the transceiver unit is further configured to transmit the synchronization signal to a lower-level device by using a second special subframe in the at least two special subframes, where the GP duration of the first special subframe is larger than a GP duration of the second special subframe.

With reference to any of the foregoing possible implementation manners, in a seventh possible implementation manner of the third aspect, the transceiver unit is configured to receive first indication information transmitted by a third device, where the first indication information is used to indicate a special subframe used by the third device; and the processing unit is configured to determine the patterns of the at least two special subframes according to the first indication information.

With reference to any of the foregoing possible implementation manners, in an eighth possible implementation manner of the third aspect, the processing unit is configured to determine the special subframe used by the third device according to the first indication information; the processing unit is configured to determine a pattern of the first special subframe in the at least two special subframes, where the GP duration of the first special subframe is larger than a GP duration of the special subframe used by the third device; and the processing unit is configured to determine patterns of other special subframes except the first special subframe in the at least two special subframes, where a GP duration of at least one special subframe in the other special subframes is different from the GP duration of the first special subframe.

With reference to any of the foregoing possible implementation manners, in a ninth possible implementation manner of the third aspect, that the processing unit is configured to determine patterns of at least two special subframes used in a broadcast control channel modification period includes: determining, by the processing unit, the patterns of the at least two special subframes used in the broadcast control channel modification period according to correspondence between a level of the first device and the patterns of the at least two special subframes.

With reference to any of the foregoing possible implementation manners, in a tenth possible implementation manner of the third aspect, the transceiver unit is configured to receive second indication information transmitted by a third device, where the second indication information is used to indicate a downlink subframe used by the third device; and the processing unit is configured to determine the patterns of the at least two special subframes according to the second indication information.

With reference to any of the foregoing possible implementation manners, in an eleventh possible implementation manner of the third aspect, that the transceiver unit is configured to determine the patterns of the at least two special subframes according to the second indication information includes: the processing unit is configured to determine the downlink subframe used by the third device according to the second indication information; the processing unit is configured to determine a pattern of the first special subframe in the at least two special subframes, where a determined GP duration of a special subframe is corresponding to a position of the downlink subframe used by the third device; and the processing unit is configured to determine patterns of other special subframes except the first special subframe in the at least two special subframes, where a GP duration of at least one special subframe in the other special subframes is different from the GP duration of the first special subframe.

With reference to any of the foregoing possible implementation manners, in a twelfth possible implementation manner of the third aspect, that the processing unit is configured to determine patterns of at least two special subframes used in a broadcast control channel modification period includes: determining, by the processing unit, the patterns of the at least two special subframes used in a first time period in the broadcast control channel modification period, where the first time period is a time period of a same uplink downlink subframe ratio.

With reference to any of the foregoing possible implementation manners, in a thirteenth possible implementation manner of the third aspect, the second device includes a user equipment, and/or, the device for generating a subframe includes a base station.

With reference to any of the foregoing possible implementation manners, in a fourteenth possible implementation manner of the third aspect, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

In a fourth aspect, a user equipment is provided and includes: a transceiver unit, configured to receive control information transmitted by a first device, where the control information is used to indicate at least two special subframes used by the first device in a broadcast control channel modification period, and guard period GP durations of the at least two special subframes are different; and a processing unit, configured to determine patterns of the at least two special subframes according to the first indication information.

In a first possible implementation manner of the fourth aspect, the control information includes: ratio patterns of the at least two special subframes and/or special subframe effective time.

With reference to any of the foregoing possible implementation manners, in a second possible implementation manner of the fourth aspect, the special subframe effective time includes: a special subframe position; or, a special subframe offset and period.

With reference to any of the foregoing possible implementation manners, in a third possible implementation manner of the fourth aspect, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

In the foregoing solutions, at least two subframes exist in a broadcast control channel modification period. In this way, flexibility is enhanced, and a system resource utilization rate is improved in contract with a condition in the prior art that only one special subframe exists.

DETAILED DESCRIPTION

The following clearly describes technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention. In a case of no collision, the embodiments of the present invention and the features in each embodiment may be combined mutually.

In the embodiments of the present invention, a first device may be a base station, for example, a synchronous source base station. A second device may be a base station or a user equipment. A third device may be a base station.

The user equipment may be a mobile terminal (Mobile Terminal, MT for short), a mobile user equipment, or the like, and may communicate with one or more core networks through a radio access network (for example, Radio Access Network, RAN for short). The user equipment may be a mobile terminal, such as a mobile phone (or called a "cellular" phone) or a computer having a mobile terminal which, for example, may be a portable, pocket, handheld, computer built-in, or vehicle-mounted mobile apparatus.

The base station may either be a base station (base transceiver station, BTS for short) in GSM or CDMA, a base station (NodeB) in WCDMA, or a base station (evolved Node B, eNB for short) in LTE.

Figure 1:
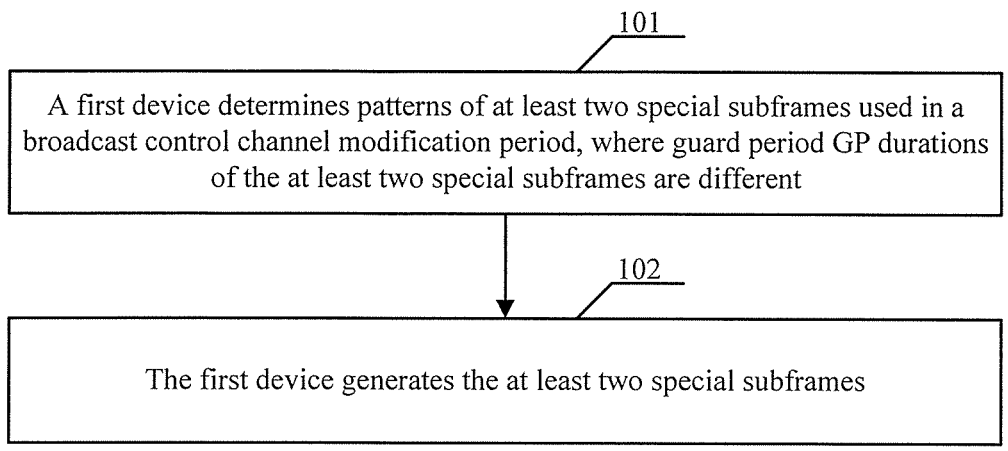
FIG. 1 is a flowchart of a method for generating a subframe according to an embodiment of the present invention.

As shown in FIG. 1, an embodiment of the present invention provides a method for generating a subframe, including:

Step 101: A first device determines patterns of at least two special subframes used in a broadcast control channel modification period. Guard period GP durations of the at least two special subframes are different.

Step 102: The first device generates the at least two special subframes.

In the prior art, flexibility of a special subframe ratio is low. That is, the special subframe ratio remains unchanged at least in a time range of several hundred ms. In the embodiment, the at least two special subframes are generated by the first device in the broadcast control channel modification period, and the guard period GP durations of the at least two special subframes are different, so that the special subframe ratio may be changed flexibly in a certain time range. The time range may either be dozens of ms, for example, 10 ms, 20 ms or 30 ms, or several hundred ms, for example, 100 ms, thereby increasing the flexibility of the special subframe ratio.

Preferably, after step 101, the first device generates control information used to indicate the at least two special subframes, and transmits the control information to a second device. By means of the embodiment, the second device may learn special subframe information of the first device, thereby performing correct data receiving, data demodulation, channel quality measurement or special subframe configuration.

Optionally, the control information includes: ratio patterns of the at least two special subframes and/or special subframe effective time.

Preferably, the special subframe effective time includes: a special subframe position; or, a special subframe offset and period.

In a preferred implementation manner of the embodiment of the present invention, after step 102, the first device receives a signal by using a GP of a first special subframe in the at least two special subframes, and transmits the signal by using a downlink pilot time slot in the first special subframe.

In another preferred implementation manner of the embodiment of the present invention, after receiving the signal by using the GP of the first special subframe in the at least two special subframes, the first device implements synchronous tracking, energy detection, and/or signal parsing by using the received signal.

In another preferred implementation manner of the embodiment of the present invention, that the first device receives a signal by using a GP of a first special subframe in the at least two special subframes includes: receiving, by the first device, a synchronization signal by using the GP of the first special subframe; and transmitting, by the first device, the synchronization signal to a lower-level device by using a downlink subframe and/or a second special subframe in the at least two special subframes, where the GP duration of the first special subframe is larger than a GP duration of the second special subframe. By means of the embodiment, it can be implemented in a relatively small time range, for example, in the broadcast control channel modification period, that the first device receives the signal by using the GP of the first special subframe, which is longer in the at least two special subframes, where the signal is used to perform synchronous tracking, energy detection, and/or signal parsing; transmits the signal to the lower-level device by using the downlink subframe and/or the second special subframe in the at least two special subframes, so that the first device uses a special subframe with a longer GP duration only when using the GP to receive the signal, and uses a special subframe with a shorter GP duration when the first device does not receive the signal by using the GP; therefore, data transmission efficiency of the first device may be increased. Meanwhile, by means of the embodiment, since the first device receives the signal by using the GP of the first special subframe in a relatively small time range, for example, in the broadcast control channel modification period, where the signal is used to perform synchronous tracking, energy detection, and/or signal parsing, and transmits the signal to the second device by using the second special subframe or the downlink subframe, where the signal is used by the second device to perform synchronous tracking, energy detection, and/or signal parsing; therefore, the second device is enabled to receive the signal from the first device in the relatively small time range, with regard to the first device using the special subframe with a shorter GP duration or the downlink subframe position, so as to perform synchronous tracking, energy detection, and/or signal parsing, thereby implementing a system with more than two hops, which receives a signal by using a GP.

Preferably, step 101 may be implemented in at least one of the following manners:

Manner 1: The first device receives first indication information transmitted by a third device, where the first indication information is used to indicate a special subframe used by the third device. The first device determines the patterns of the at least two special subframes according to the first indication information.

Preferably, that the first device determines the patterns of the at least two special subframes according to the first indication information includes: determining, by the first device, the special subframe used by the third device according to the first indication information; the first device determines a pattern of the first special subframe in the at least two special subframes, where the GP duration of the first special subframe is larger than a GP duration of the special subframe used by the third device; the first device determines patterns of other special subframes except the first special subframe in the at least two special subframes, where a GP duration of at least one special subframe in the other special subframes is different from the GP duration of the first special subframe.

Manner 2: The first device determines the patterns of the at least two special subframes used in the broadcast control channel modification period according to correspondence between a level of the first device and the patterns of the at least two special subframes. The correspondence may be one-to-one correspondence, one-to-many correspondence, or many-to-one correspondence. The correspondence may be represented by either a correspondence table or a certain function relationship.

Manner 3: The first device receives second indication information transmitted by a third device, where the second indication information is used to indicate a downlink subframe used by the third device. The first device determines the patterns of the at least two special subframes according to the second indication information.

Optionally, that the first device determines the patterns of the at least two special subframes according to the second indication information includes: determining, by the first device, the downlink subframe used by the third device according to the second indication information; determining, by the first device, a pattern of the first special subframe in the at least two special subframes, where the GP duration of the first special subframe is larger than a GP duration of the downlink subframe used by the third device; determining, by the first device, patterns of other special subframes except the first special subframe in the at least two special subframes, where a GP duration of at least one special subframe in the other special subframes is different from the GP duration of the first special subframe.

Preferably, that the first device determines patterns of at least two special subframes used in a broadcast control channel modification period includes: determining, by the first device, the patterns of the at least two special subframes used in a first time period in the broadcast control channel modification period, where the first time period is a time period of a same uplink downlink subframe ratio. A determining manner may be any one of the foregoing manners 1 to 3.

Optionally, the second device includes a user equipment, and/or, the first device includes a base station.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

Figure 2:
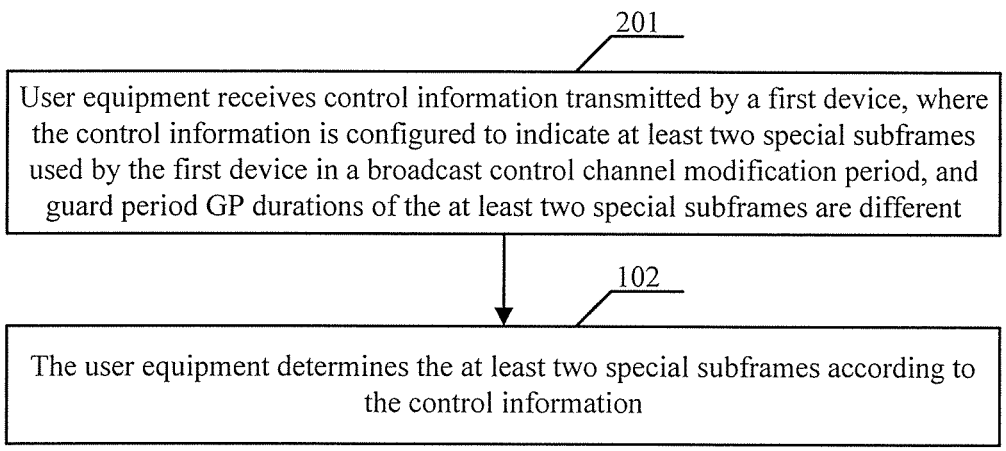
FIG. 2 is a flowchart of a method for determining a subframe according to an embodiment of the present invention.

As shown in FIG. 2, an embodiment of the present invention provides a method for determining a subframe, including:

Step 201: A user equipment receives control information transmitted by a first device, where the control information is used to indicate at least two special subframes used by the first device in a broadcast control channel modification period, and guard period GP durations of the at least two special subframes are different.

Step 202: The user equipment determines the at least two special subframes according to the control information.

Optionally, the control information includes: ratio patterns of the at least two special subframes and/or special subframe effective time.

Optionally, the special subframe effective time includes: a special subframe position; or, a special subframe offset and period.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

With reference to specific embodiments, the following describes an implementation process of the embodiment of the present invention.

It should be noted that contents of the embodiment of the present invention are also applicable to any network snooping scenario. For example, after receiving a signal by using a GP of a special subframe in the at least two special subframe, the first device may perform at least one of the following operations by using the received signal.

One operation performed by the first device by using the received signal is that the first device performs synchronous tracking on a device transmitting the signal by using the received signal.

Another operation performed by the first device by using the received signal is that the first device may learn interference information by performing energy detection on the received signal. For example, energy of the received signal may be learnt through the energy detection on the received signal, so that information about interference to the first device caused by the device transmitting the received signal can be approximately determined. Preferably, the first device may use the information about the interference and take certain measures to prevent interference. For example, if the obtained energy of the received signal is relatively large, the interference to the first device caused by the device transmitting the received signal is relatively large. The first device may transmit data by selecting time, frequencies, space resources, or any combination of the foregoing resources with relatively small mutual orthogonality or mutual interference to the device transmitting the received signal.

Another operation performed by the first device by using the received signal is that the first device may learn configuration information of the device transmitting the received signal by performing signal parsing on the received signal. The configuration information may be at least one of the following: TDD configuration information of the device transmitting the received signal, MBSFN (Multimedia Broadcast multicast service Single Frequency Network, multimedia broadcast multicast service single frequency network) subframe configuration information, ABS (Almost Blank Subframe, almost blank subframe) subframe configuration information, frequency load information, and frequency transmit power information. The frequency load information may be information about a service load on each working frequency of the device transmitting the received signal. The frequency transmit power information may be information about transmit power on each working frequency of the device transmitting the received signal.

For ease of description, in all the embodiments of the present invention, an example that the first device performs the synchronous tracking by using the received signal after receiving the signal by using the GP of the special subframe in the at least two subframes is used. It should be noted that when the following embodiments are applied in a case that the first device performs the energy detection or signal parsing by using the received signal after receiving the signal by using the GP of the special subframe in the at least two subframes, a synchronous base station in the following embodiments may be replaced by a target base station that receives the signal by using the GP of the special subframe in the at least two subframes. A synchronous source base station may be replaced by a source base station that transmits the received signal. The synchronous tracking may be replaced by the energy detection or signal parsing performed by the first device by using the received signal. A synchronous tracking moment may be replaced by a moment that the first device receives the signal by using the GP of the special subframe in the at least two special subframes. A non-synchronous tracking moment may be replaced by a moment that the first device receives the signal without using the GP of the special subframe in the at least two special subframes. A special subframe moment for preventing synchronous tracking interference may be replaced by a special subframe moment that, when the source base station of the target base station receives the signal by using the GP, the target base station does not transmit or only transmits the signal at some moments at the moment that the source base station of the target base station receives the signal by using the GP, so as to prevent the interference possibly caused to the source base station of the target base station when receiving the signal by using the GP. In addition, the first device may be either the target base station or the source base station, or may be the target base station and the source base station at the same time. In addition, the signal herein may be at least one of the following: a PSS (Primary Synchronization Signal, primary synchronization signal), an SSS (Secondary Synchronization Signal, secondary synchronization signal), a CRS (Common Reference Signal, common reference signal), a CSI-RS (Channel State Information Reference Signal, channel state information reference signal), an MBSFN RS (MBSFN RS, MBSFN reference signal), or any other reference signal that may be learnt by the target base station, or a signal received by a receiver channel of the target base station.

Embodiment 1

It is predicated that mobile data service traffic demands in the future five years will increase by 40 times, with an annual increase of 8 to 10 times. To cope with the rapidly increasing traffic demands, one effective way is: to densely deploy small cells (Small cell) in some indoor or outdoor hot spots based on a traditional macro base station cellular network. The Small cells have features of a small coverage range and low transmit power, and are suitable to provide high rate data transmission services, perform data offload on a macro cellular network, and reduce network deployment costs of a carrier. Forms of the small cells (Small cell) may include: Metro cell, Micro cell, Pico cell, Femtocell, or WLAN (Wireless Local Area Networks, wireless local area networks) using a Wi-Fi (Wireless Fidelity, wireless fidelity) technology, or the like. Radio network access nodes used by different forms of the small cells are collectively called the small cells herein.

After the small cells are imported, one means of overcoming restrictions of backhauls between the small cells and those between the small cells and the macro cellular network is that the small cells obtain information or information exchange by using a radio signal receiving technology. In view of ensuring backward compatibility of a user equipment of a non-evolution version, a method for a TDD system is that a small cell receives a signal by using a guard period GP of a special subframe. Since a current special subframe ratio is carried in a system broadcast message for notification and remains unchanged in a relatively long period, which is generally unchanged in several hundred ms (for example, 320 ms or 640 ms), such special subframe ratio setting lacks flexibility with regard to a scenario in which the signal is received by using the guard period GP of the special subframe.

The embodiment provides an implementation manner that a first device determines patterns of two special subframes used in a broadcast control channel modification period, where guard period GP durations of the two special subframes are different. The embodiment may either be separately used, or be used as an implementation manner that "a first device determines patterns of at least two special subframes used in a broadcast control channel modification period, where guard period GP durations of the at least two special subframes are different", and used together with each embodiment in the present invention.

It should be noted that in this specification, the Broadcast Control Channel modification period (BCCH modification period, broadcast control channel modification period) may be time defined for a user terminal of a non-evolution version. For example, the BCCH modification period is equal to a product of a modification period coefficient modificationPeriodCoeff and a default paging cycle defaultPagingCycle. A value range of the modificationPeriodCoeff may be [1, 2, 4, 8]. A value range of the defaultPagingCycle may be [320 ms, 640 ms, 1280 ms and 2560 ms]. That is, the BCCH modification period may be 320 ms, 640 ms, 1280 ms, 2560 ms, or 5120 ms. In addition, the BCCH modification period herein may also indicate any other time duration that is not equal to the product of the modificationPeriodCoeff and the defaultPagingCycle. For example, for a scenario of a flexible TDD uplink downlink subframe special ratio, the BCCH modification period may be considered as a time range that indicates integral multiples of 5 ms, such as 10 ms, 15 ms, or 20 ms. Moreover, in the time range, the TDD uplink downlink subframe ratio remains unchanged. The BCCH modification period may be notified to a second device by using RRC (Radio Resource Control, radio resource control) signaling, a system broadcast message, MAC (Medium Access Control, medium access control) signaling, or physical layer signaling.

It should be noted that the pattern of the special subframe pattern herein may be a pattern represented by the special subframe ratio, that is, the number or proportion of OFDM symbols occupied by DwPTS, GP and UpPTS in a subframe.

A typical scenario corresponding to the embodiment is a synchronous single-hop system. The synchronous single-hop system refers to a base station or a synchronous source base station or a synchronous base station in a system implementing synchronization based on a radio signal.

In the embodiment of the present invention, the first device corresponds to a synchronous base station. The synchronous base station herein refers to a base station that reads a signal of another device by using a GP of a special subframe so as to acquire synchronization. A synchronous source base station corresponding to the synchronous base station refers to a base station that transmits the signal, so that the synchronous base station may acquire synchronization according to the signal.

The synchronous base station may determine a special subframe ratio of the synchronous base station according to a special subframe ratio of a synchronous source base station of the synchronous base station, a downlink subframe used by the synchronous source base station of the synchronous base station, a coverage range demand of the synchronous base station, a data transmission efficiency demand of the synchronous base station or a level of the synchronous base station.

The special subframe ratio of the synchronous base station includes two types: one type is a special subframe ratio 1 used by the synchronous base station to implement synchronous tracking by using the GP of the special subframe, and the other type is a special subframe ratio 2 used by the synchronous base station at a non-synchronous tracking moment (that is, implementing synchronous tracking without using the GP of the special subframe). A GP duration of the special subframe ratio 2 is not equal to a GP duration of the special subframe ratio 1. Moreover, the special subframe ratio 1 and the special subframe ratio 2 are in the same BCCH modification period.

One manner for the synchronous base station to determine the special subframe ratio of the synchronous base station is that the synchronous base station determines the special subframe ratio of the synchronous base station according to the special subframe ratio of the synchronous source base station of the synchronous base station. The synchronous base station may acquire the special subframe ratio of the synchronous source base station and/or position information of the special subframe ratio of the synchronous source base station in a signaling manner. The signaling herein refers to information carried by system broadcast signaling such as PBCH (Physical Broadcast Channel, physical broadcast channel), RRC signaling, MAC signaling, or physical layer signaling. Moreover, signaling for carrying the special subframe ratio of the synchronous source base station and signaling for carrying the position information of the special subframe ratio of the synchronous source base station may either be the same or different. After the synchronous base station acquires the information, the special subframe ratio 1 used by the synchronous base station to implement synchronous tracking by using the GP of the special subframe may be determined. The GP duration in the special subframe ratio 1 is required to be at least larger than the GP duration in the special subframe used by the synchronous source base station of the synchronous base station at the non-synchronous tracking moment, or the GP duration in the special subframe ratio 1 may ensure that the synchronous base station receives a synchronization signal transmitted by the synchronous source base station of the synchronous base station by using the GP. Optionally, the synchronous base station may only acquire the special subframe ratio used by the synchronous source base station at the non-synchronous tracking moment in a signaling manner. A special subframe position at which the special subframe ratio 1 is located may also be corresponding to a position of the special subframe used by the synchronous source base station of the synchronous base station at the non-synchronous tracking moment, so that the synchronous base station may implement synchronous tracking on the synchronous source base station by using the GP at the special subframe position at which the special subframe ratio 1 is located. In addition, the synchronous base station may further determine the special subframe ratio 2 used by the synchronous base station at the non-synchronous tracking moment according to the coverage range demand of the synchronous base station and/or the data transmission efficiency demand of the synchronous base station. The GP duration of the special subframe ratio 2 is not equal to the GP duration of the special subframe ratio 1. Moreover, the special subframe ratio 1 and the special subframe ratio 2 are in the same BCCH modification period.

Figure 3:
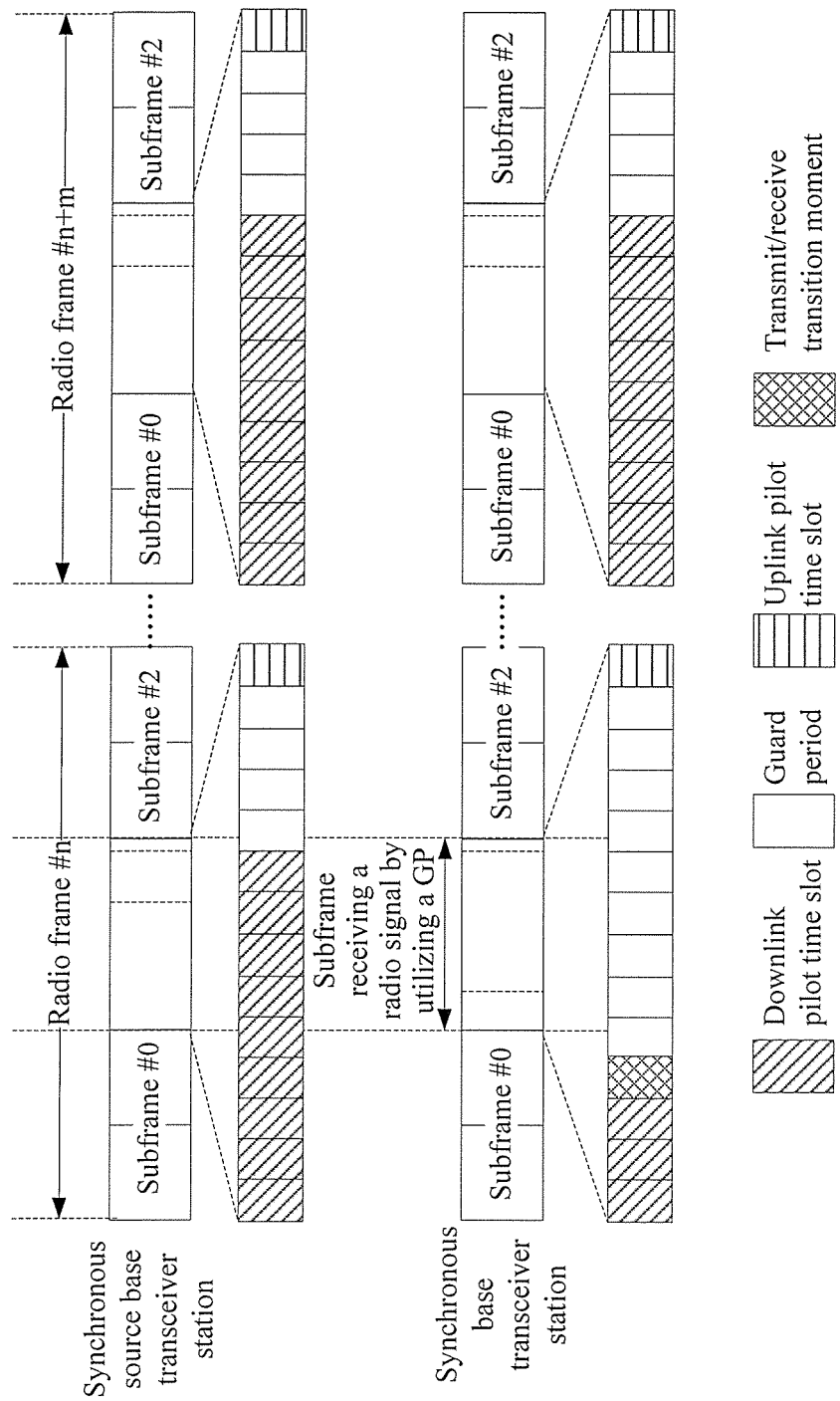
FIG. 3 is a schematic diagram of using a flexible GP to implement synchronous tracking according to an embodiment of the present invention.

For example, as shown in FIG. 3, the special subframe ratio 1 is used as a special subframe ratio in a radio frame #n (radio frame #n) on the synchronous base station side. In the radio frame, the synchronous base station uses the GP of the special subframe ratio 1 to listen to a common reference signal CRS of the synchronous source base station to acquire synchronous timing information. Since it takes a component certain time for transmitting, receiving, and forwarding, the synchronous base station requires an interval for switching from transmitting into receiving before being switched from downlink transmitting (corresponding to first three OFDM symbols) into a synchronous tracking state. The interval may be implemented by using one OFDM symbol. Meanwhile, the special subframe ratio 2 is used as a special subframe ratio in a radio frame #n+m (radio frame #n+m) on the synchronous base station side. The GP duration of the special subframe ratio 2 and the GP duration of the special subframe ratio 1 are different. On the special subframe with the special subframe ratio 2, the synchronous base station does not listen to the signal of the synchronous source base station and does not implement synchronous tracking on the synchronous source base station. Core contents of the embodiment are further understood with reference to Table 1. In FIG. 3, a ratio 0 (corresponding to a GP duration of 9 OFDM symbols) is used for the special subframe of the synchronous source base station. A ratio 1 (corresponding to a GP duration of 4 OFDM symbols) is used for the special subframe of the synchronous base station in the radio frame #n. Moreover, the GP of the special subframe ratio 1 in the radio frame #n is used to implement synchronous tracking on the synchronous source base station. That is, "the CRS of the synchronous source base station on a fifth OFDM symbol and the CRS of the synchronous source base station on an eighth OFDM symbol are tracked by using the GP" at "the subframe implementing radio signal reception by using the GP", so as to implement synchronous tracking on the synchronous source base station. Meanwhile, in the radio frame #n+m, if the synchronous base station does not need to use the GP of the special subframe in the radio frame to perform synchronous tracking, the special subframe ratio 2 may be used as the special subframe ratio of the synchronous base station, so the special subframe ratio 2 may be the same as the special subframe ratio of the synchronous source base station. Apparently, for the synchronous base station, the GP duration in the special subframe ratio 1 is not equal to the GP duration in the special subframe ratio 2. It should be noted that for FIG. 3, when the synchronous source base station is a base station that may implement synchronization by using a global positioning system GPS (Global Positioning System), such as a macro base station MeNB (Macro eNB), different special subframe ratios may not be used on the MeNB. That is, a synchronous tracking moment may not exist at the MeNB end. However, flexibly configured special subframes may also be implemented on the MeNB. That is, the macro eNB may determine two special subframe ratios in one BCCH modification period. Guard period GP durations of the two special subframes are different. In addition, m in the foregoing figure may be a half radio frame (half radio frame, where m corresponds to ½), may be one radio frame (one radio frame, where m corresponds to 1), and may further be integer radio frames. The integer may be one BCCH modification period. Further, a frame offset may exist between the synchronous source base station and the synchronous base station in the figure. That is, the radio frame #n of the synchronous source base station in FIG. 3 may correspond to the radio frame #n+m of the synchronous base station in FIG. 3, where m is not equal to 0.

TABLE 1

Special subframe ratio

| | Normal CP | | | Extended CP | | |
|---|---|---|---|---|---|---|
| Config | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |

Another manner for the synchronous base station to acquire the special subframe ratio of the synchronous base station is that the synchronous base station determines the special subframe ratio of the synchronous base station according to a downlink subframe used by the synchronous source base station of the synchronous base station. The synchronous base station may either acquire the downlink subframe position of the synchronous source base station in a signaling manner, or acquire the downlink subframe position in a predefined manner. The signaling herein may be system broadcast signaling such as information carried by a PBCH channel, RRC signaling, MAC signaling, or physical layer signaling. Moreover, signaling for carrying the special subframe ratio of the synchronous source base station and signaling for carrying the position information of the special subframe ratio of the synchronous source base station may either be the same or different. After the synchronous base station acquires the information, the special subframe ratio 1 used to implement synchronous tracking by using the GP may be determined. The GP duration in the special subframe ratio 1 may ensure that the synchronous base station can receive a synchronization reference signal transmitted by the synchronous source base station. The synchronization reference signal refers to a signal that may ensure that the synchronous base station acquires the synchronous timing information of the synchronous source base station. In addition, the synchronous base station may further determine the special subframe ratio 2 used by the synchronous base station at the non-synchronous tracking moment according to the coverage range demand of the synchronous base station and/or the data transmission efficiency demand of the synchronous base station. The GP duration of the special subframe ratio 2 is not equal to the GP duration of the special subframe ratio 1. Moreover, the special subframe ratio 1 and the special subframe ratio 2 are in the same BCCH period modification period.

Figure 4:
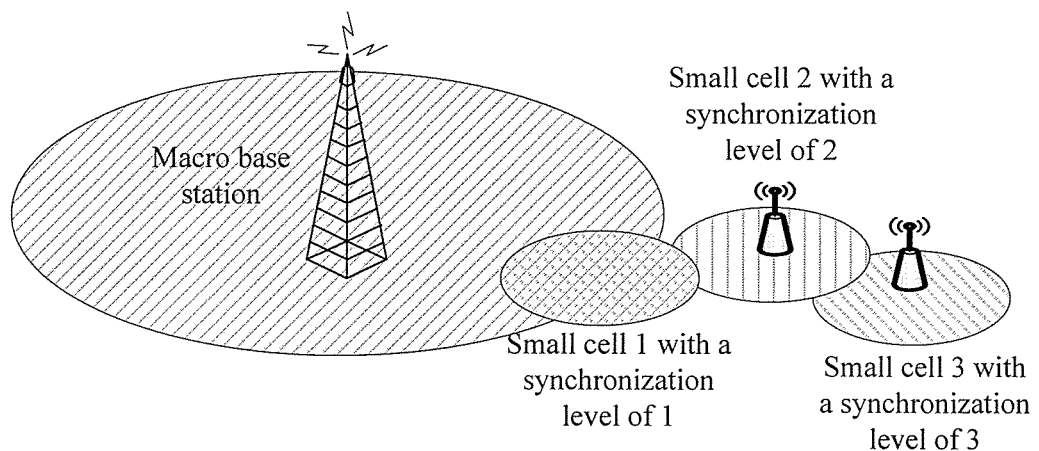
FIG. 4 is a schematic diagram of a synchronous level according to an embodiment of the present invention.

Another manner for the synchronous base station to acquire the special subframe ratio of the synchronous base station is that the synchronous base station determines the special subframe ratio of the synchronous base station according to the level of the synchronous base station. After learning its own synchronization level (the synchronization level herein may either be acquired in a signaling manner or in a blind detection manner), the synchronous base station (or the synchronous source base station) may obtain the synchronous tracking moment and the non-synchronous tracking moment by correspondence, thereby being capable of using a relatively long GP to implement the synchronous tracking on the synchronous source base station at the synchronous tracking moment and using a relatively short GP at the non-synchronous tracking moment. To be specific, the synchronous base station may use correspondence between the level of the synchronous base station and at least one of the following to determine the special subframe ratio 1 used to implement synchronous tracking by using the GP and/or the position of the special subframe using the special subframe ratio 1: the special subframe ratio and the position of the special subframe using the special subframe ratio, where the special subframe ratio 1 used for synchronous tracking or the position of the special subframe using the special subframe ratio 1 may also be predefined. Optionally, the level of the synchronous base station herein may be related to synchronization precision for implementing synchronization based on a radio signal. As shown in FIG. 4, a synchronization relationship between small cells (small cell) is: a macro base station acquires synchronous timing information (synchronization precision of the macro base station may be considered highest; therefore, a synchronization level may be set to 0) by using a GPS. A small cell 1 may directly acquire the synchronous timing information by using the macro base station; therefore, synchronization precision is second highest and a synchronization level may be set to 1. A small cell 2 acquires the synchronous timing information by using the small cell 1. Due to a cause of synchronization error broadcast, synchronization precision is third highest and a synchronization level may be set to 2. A small cell 3 acquires the synchronous timing information by using the small cell 2. Synchronization precision may be considered fourth highest and a synchronization level may be set to 3 . . . , where the figures herein merely represent a relative relationship of synchronization levels. Representation in other forms is also allowable. Apparently, a base station with a synchronization level of 1 may either be considered as a synchronous base station acquiring the synchronization information by using a base station with a synchronization level of 0, or be considered as a synchronous source base station providing the synchronization information for a base station with a synchronization level of 2. In addition, the level of the synchronous base station herein may also be represented by a cell ID (Cell Identity) of the synchronous base station. That is, each cell ID is at least corresponding to the special subframe ratio 1 used for synchronous tracking and/or the position of the special subframe using the special subframe ratio 1, where the special subframe ratio 1 used for synchronous tracking or the position of the special subframe using the special subframe ratio 1 may also be predefined. Moreover, the synchronous base station may further determine the special subframe ratio 2 used by the synchronous base station at the non-synchronous tracking moment according to the coverage range demand of the synchronous base station and/or the data transmission efficiency demand of the synchronous base station. The GP duration of the special subframe ratio 2 is not equal to the GP duration of the special subframe ratio 1. Moreover, the special subframe ratio 1 and the special subframe ratio 2 are in the same BCCH modification period. The implementation manner is further described in detail. For example, only two special subframe ratios, such as configuration 0 and configuration 1, with different GPs exist in a system by default. When learning that its own synchronization level is 1 (the synchronization level herein may either be acquired in a signaling manner or in a blind detection manner), the synchronous base station may determine to implement synchronous tracking by using the GP of the special subframe in the radio frame #n according to a predefined manner. Therefore, the GP of the special subframe in the radio frame #n uses the configuration 0 with a longer GP, so that the synchronous base station may implement synchronous tracking on the synchronous source base station. The configuration 1 with a shorter GP may be used for the special subframes in other radio frames.

It should be noted that a manner for the synchronous base station to determine the special subframe ratio may be any combination of the foregoing manners. For example, the synchronous base station may acquire the special subframe ratio of the synchronous source base station in a signaling manner, thereby determining the special subframe ratio of the synchronous base station and afterwards determining the position of the special subframe using the special subframe ratio by using correspondence between the synchronization level of the synchronous base station and the position of the special subframe using the special subframe ratio.

The synchronous base station determines the special subframe ratio of the synchronous base station according to the special subframe ratio of the synchronous source base station of the synchronous base station. The synchronous base station may, and/or, the position information of the special subframe ratio of the synchronous source base station.

After determining the patterns of the two special subframes used in the broadcast control channel modification period, the synchronous base station generates the two special subframes, where the GPs of the two special subframes are different. To be specific, ratios of the two special subframes and/or positions of the two special subframes may be included.

Embodiment 2

This embodiment provides an implementation manner that a first device determines patterns of three special subframes used in a broadcast control channel modification period, where guard period GP durations of at least two special subframes in the three special subframes are different. The embodiment may either be used alone, or be used as an implementation manner that "a first device determines patterns of at least two special subframes used in a broadcast control channel modification period, where guard period GP durations of the at least two special subframes are different", and jointly used with each embodiment in the present invention. A typical scenario corresponding to the embodiment of the present invention is a synchronous multi-hop system. The synchronous multi-hop system refers to a system implementing synchronization based on a radio signal, in which at least one base station is both a synchronous base station and a synchronous source base station.

Based on Embodiment 1, the special subframe ratio of the synchronous base station of the embodiment may further include a special subframe ratio 3. The special subframe ratio 3, the special subframe ratio 1, and the special subframe ratio 2 are located in the same BCCH modification period. The special subframe ratio 3 may be a ratio used by a special subframe used to prevent synchronous tracking interference. For ease of description, a special subframe with the special subframe ratio 3 may be called the special subframe preventing the synchronous tracking interference. The preventing the synchronous tracking interference refers to that, when a synchronous source base station of the synchronous base station implements synchronous tracking, the synchronous base station may not transmit or transmit a signal at some moments by configuring a proper GP duration in the special subframe during a process that the synchronous source base station of the synchronous base station implements synchronous tracking.

As shown in FIG. 4, a typical scenario corresponding to the embodiment is a multi-hop synchronization network implementing synchronization based on a radio signal. For a special subframe ratio of a base station end with a synchronization level of 1, reference may be made to the special subframe ratio of the synchronous base station in FIG. 3. That is, only two special subframe ratios may exist in the base station with a synchronization level of 1. One is a special subframe ratio 1 at a synchronous tracking moment (located in a radio frame #n) and the other is a special subframe ratio 2 (located in any other radio frame, such as the radio frame #n+1, #n+2, or #n+3 in the embodiment). The design principles of the special subframe ratios are the same as the descriptions in FIG. 3, and therefore are not described herein again.

Figure 5:
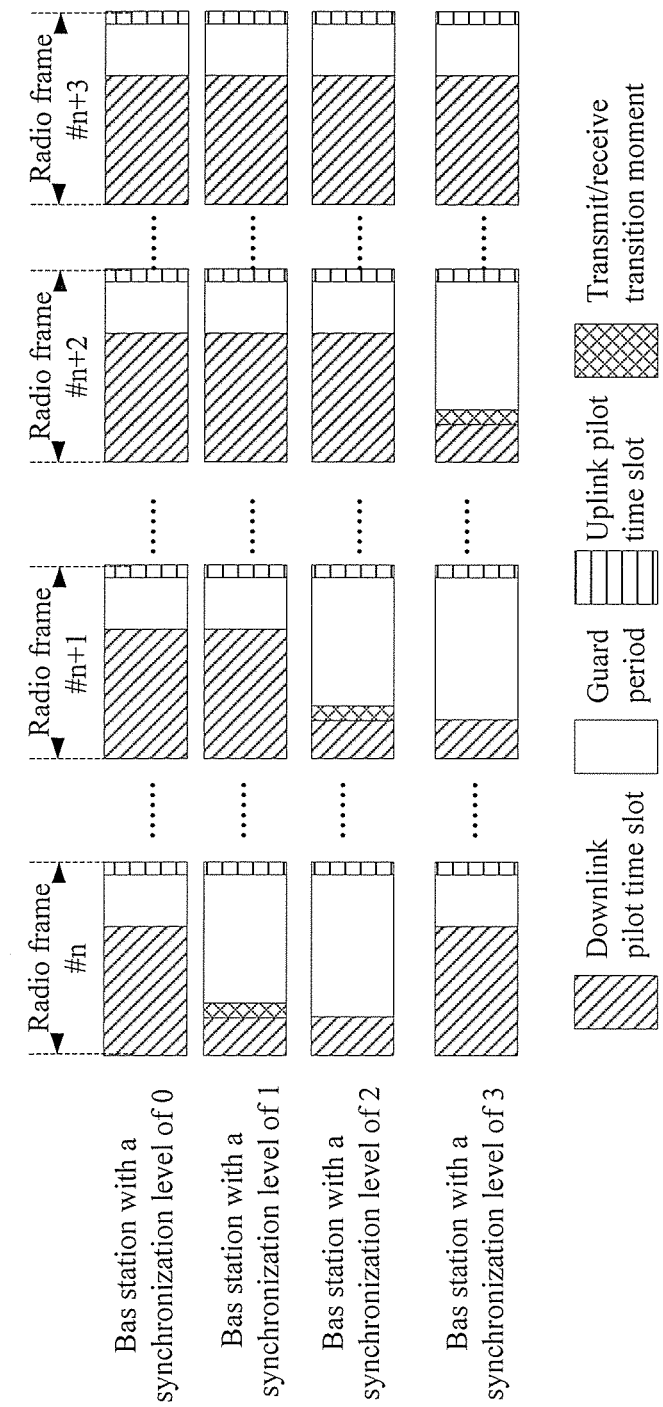
FIG. 5 is a schematic diagram of using a flexible GP to implement synchronous tracking according to another embodiment of the present invention.

Three special subframe ratios may exist in the base station with a synchronization level of 2. The GP used by the special subframe ratio 3 in the radio frame #n is to prevent interference generated at the moment of implementing synchronous tracking on the base station with a synchronization level of 1, that is, to ensure that the base station with a synchronization level of 2 does not transmit any signal or merely transmit partial signals (in the embodiment, the base station with a synchronization level of 2 does not transmit any signal at the synchronous tracking moment of the base station with a synchronization level of 1) when the base station with a synchronization level of 1 implements synchronous tracking on the base station with a synchronization level of 0. The GP duration in the special subframe ratio is required to be no less than the GP duration in the special subframe ratio used by the base station with a synchronization level of 1 at the synchronous tracking moment. The GP duration used by the special subframe ratio 1 in the radio frame #n+1 is to implement synchronous tracking on the synchronous source base station which, to be specific, is the base station with a synchronization level of 1. As shown in FIG. 5, the GP duration in the special subframe ratio 1 in the radio frame #n+1 used by the base station with a synchronization level of 2 is apparently larger than the GP duration in the base station with a synchronization level of 1 at the non-synchronous tracking moment, so as to implement synchronous tracking on the synchronous source base station which, to be specific, is the base station with a synchronization level of 1. At the non-synchronous tracking moment (located in any other radio frame, such as the radio frame #n+2 or #n+3 in the embodiment), the special subframe ratio 2 may be used. The GP duration in the special subframe ratio 2 and the GP duration in the special subframe ratio 1 are different. In addition, two special subframe ratios may also exist at the end of the base station with a synchronization level of 2 if prevention of the interference generated when the base station with a synchronization level of 2 implements synchronous tracking on the base station with a synchronization level of 1. One is a special subframe ratio that is synchronously tracked and the other is a special subframe ratio that is not synchronously tracked. Similar to the discussion on the base station with a synchronization level of 2, three special subframe ratios may also exist at the base station with a synchronization level of 3. That is, the GP used by the special subframe ratio 3 in the radio frame #n+1 is to prevent interference generated at the moment of implementing synchronous tracking on the base station with a synchronization level of 2, that is, to ensure that the base station with a synchronization level of 3 does not transmit any signal or merely transmit partial signals (in the embodiment, the base station with a synchronization level of 3 does not transmit any signal at the synchronous tracking moment of the base station with a synchronization level of 2) when the base station with a synchronization level of 2 implements synchronous tracking on the base station with a synchronization level of 1. The GP duration in the special subframe ratio is required to be no less than the GP duration in the special subframe ratio used by the base station with a synchronization level of 2 at the synchronous tracking moment. The GP duration used by the special subframe ratio 1 in the radio frame #n+2 is to implement synchronous tracking on the synchronous source base station which, to be specific, is the base station with a synchronization level of 2. As shown in FIG. 5, the special subframe ratio 2 may be used at the non-synchronous tracking moment (located in any other radio frame, such as the radio frame #n or #n+3 in the embodiment). The GP duration in the special subframe ratio 2 and the GP duration in the special subframe ratio 1 are different. In addition, only two special subframe ratios may also exist at the end of the base station with a synchronization level of 3 if prevention of the interference generated when the base station with a synchronization level of 3 implements synchronous tracking on the base station with a synchronization level of 2. One is a special subframe ratio that is synchronously tracked and the other is a special subframe ratio that is not synchronously tracked.

Corresponding to FIG. 5, it should be noted that the radio frame number in FIG. 5 is only for description. More extensively, at least two special subframes with different GP durations are in the same BCCH modification period. In addition, a frame offset may exist between different base stations in FIG. 5. That is, the radio frame #n of the synchronous base station with a synchronization level of 0 in FIG. 6 may be corresponding to the radio frame #n+m of the base station with a synchronization level of 1 in FIG. 5, where m is not equal to 0.

Similar to embodiment 1, the synchronous base station in the embodiment may also determine a special subframe ratio of the synchronous base station according to a special subframe ratio of a synchronous source base station of the synchronous base station, a downlink subframe used by the synchronous source base station of the synchronous base station, a coverage range demand of the synchronous base station, a data transmission efficiency demand of the synchronous base station, and a level of the synchronous base station.

In the embodiment, one manner for the synchronous base station to determine the special subframe ratio of the synchronous base station is that the synchronous base station determines the special subframe ratio of the synchronous base station according to the special subframe ratio of the synchronous source base station of the synchronous base station. Based on Embodiment 1, the synchronous base station, in addition to acquiring a special subframe ratio used by the synchronous source base station at a non-synchronous moment in a signaling manner, may further acquire a special subframe ratio used by the synchronous source base station at a synchronous tracking moment in a signaling manner, thereby determining the special subframe ratio of the synchronous base station for preventing synchronous tracking interference. To be specific, a GP duration in the special subframe ratio of the synchronous base station for preventing synchronous tracking interference is no less than a GP duration in the special subframe ratio used by the synchronous source base station of the synchronous base station at the synchronous tracking moment.

In the embodiment, another manner for the synchronous base station to acquire the special subframe ratio of the synchronous base station is that the synchronous base station determines the special subframe ratio of the synchronous base station according to a downlink subframe used by the synchronous source base station of the synchronous base station. Based on Embodiment 1, when the synchronous base station determines the special subframe ratio of the synchronous base station according to the downlink subframe used by the synchronous source base station of the synchronous base station, the synchronous base station, in addition to acquiring a downlink subframe position of the synchronous source base station in a signaling or predefined manner, may further acquire a special subframe ratio used by the synchronous source base station at the synchronous moment in a signaling manner, thereby determining the special subframe ratio of the synchronous base station for preventing synchronous tracking interference. To be specific, the GP duration in the special subframe ratio of the synchronous base station for preventing synchronous tracking interference is no less than the GP duration in the special subframe ratio used by the synchronous source base station of the synchronous base station at the synchronous tracking moment.

In the embodiment, another manner for the synchronous base station to acquire the special subframe ratio of the synchronous base station is that the synchronous base station determines the special subframe ratio of the synchronous base station according to the level of the synchronous base station. Based on Embodiment 1, when the synchronous base station determines the special subframe ratio of the synchronous base station according to the level of the synchronous base station, the synchronous base station may further use correspondence between the level of the synchronous base station and the special subframe ratio to determine the special subframe ratio of the synchronous base station for preventing synchronous tracking interference. To be specific, the GP duration in the special subframe ratio of the synchronous base station for preventing synchronous tracking interference is no less than the GP duration in the special subframe ratio used by the synchronous source base station of the synchronous base station at the synchronous tracking moment. To be further specific, for example, only two special subframe ratios, such as configuration 0 and configuration 1, with different GPs exist in a system by default. Based on Embodiment 1 and with regard to FIG. 5, when learning that its own synchronization level is 2, the synchronous base station may determine to implement synchronous tracking by using the GP in the special subframe in the radio frame #n+1 in a predefined manner. Therefore, the GP in the special subframe in the radio frame #n+1 uses the configuration 0 with a longer GP, so that the synchronous base station may implement synchronous tracking on the synchronous source base station. The configuration 0 with a longer GP may also be used for the GP in the special subframe in the radio frame #n, so that no interference is caused on synchronous tracking of the synchronous base station with a synchronization level of 1 (synchronous base station with a synchronization level of 1 is the synchronous source base station of the synchronous base station with a synchronization level of 2). The configuration 1 with a shorter GP may be used for the special subframes in other radio frames.

It should be noted that a manner for the synchronous base station to determine the special subframe ratio may be any combination of the foregoing manners. For example, the synchronous base station may acquire the special subframe ratio of the synchronous source base station in a signaling manner, thereby determining the special subframe ratio of the synchronous base station and afterwards determining a position of the special subframe using the special subframe ratio by using correspondence between the synchronization level of the synchronous base station and the position of the special subframe using the special subframe ratio.

After determining the patterns of the three special subframes in the BCCH modification period, the synchronous base station generates the three special subframes, where the guard period GPs of at least two special subframes in the three special subframes are different. To be specific, ratios of the three special subframes and/or positions of the three special subframes may be included.

Embodiment 3

The embodiment provides an implementation manner for synchronous tracking.

As previously mentioned, a synchronous base station may determine a special subframe ratio of the synchronous base station according to a special subframe ratio of a synchronous source base station of the synchronous base station, a downlink subframe used by the synchronous source base station of the synchronous base station, a coverage range demand of the synchronous base station, a data transmission efficiency demand of the synchronous base station, and a level of the synchronous base station. The special subframe ratio of the synchronous base station at least includes two types: one is a special subframe ratio 1 used by the synchronous base station at a synchronous tracking moment, and the other one is a special subframe ratio 2 used by the synchronous base station at a non-synchronous tracking moment. A GP duration of the special subframe ratio 2 is not equal to a GP duration of the special subframe ratio 1. Moreover, the special subframe ratio 1 and the special subframe ratio 2 are in the same BCCH modification period. Optionally, the special subframe ratio of the synchronous base station may further include a special subframe ratio 3. The special subframe ratio 3 may be a special subframe ratio used to prevent synchronous tracking interference.

Step 1: The synchronous base station is just switched on to execute a synchronous source search process, so as to determine a synchronous source base station.

After being switched on, the synchronous base station firstly executes the synchronous source search process. The synchronous source base station refers to a base station that may provide synchronous timing information for the synchronous base station. The synchronous base station may determine the synchronous source base station according to strength of a signal searched out. The signal herein may be a primary synchronization signal PSS (Primary Synchronization Signal), a secondary synchronization signal SSS (Secondary Synchronization Signal), a common reference signal CRS (Common Reference Signal), a channel state information reference signal CSI-RS (Channel State Information Reference Signal), a multicast single frequency network reference signal MBSFN RS (Multi Broadcast Single Frequency Network Reference Signal), any other reference signal, or a signal received by a receiver channel of the synchronous base station. The signal strength herein may be represented as signal energy. The synchronous base station may determine a detected base station with highest signal strength as the synchronous source base station. The synchronous base station may further determine the synchronous source base station according to a synchronization level searched out. For example, a base station with a relatively high synchronization level is determined as the synchronous source base station. The synchronization level herein may be used to reflect synchronization precision of the base station as previously mentioned, and therefore is not described herein again. Optionally, when searching out two synchronous source base stations with comparable signal strength, the synchronous base station may further determine which synchronous source base station is to be selected as a final synchronous source base station according to the synchronization levels of the two synchronous source base stations.

Step 2: The synchronous base station acquires the special subframe ratio of the synchronous source base station.

After the synchronous base station determines the synchronous source base station, any acquiring manner mentioned in the foregoing embodiments may be used as an acquiring manner for acquiring the special subframe ratio of the synchronous source base station. The special subframe ratio herein may be one special subframe ratio, two special subframe ratios, three special subframe ratios, or any other number of special subframe ratios. The special subframe ratio herein represents the number of OFDM symbols used for downlink data transmission in a special subframe (for example, the number of OFDM symbols occupied by DwPTS), the number of OFDM symbols used for a guard period (for example, the number of OFDM symbols occupied by a GP) or the number of OFDM symbols used for receiving uplink data (for example, the number of OFDM symbols occupied by UpPTS), and may further be a proportion among the number of the OFDM symbols occupied by the downlink data transmission, the number of the OFDM symbols occupied by the guard period, and the number of the OFDM symbols for receiving the uplink data, a special subframe ratio in an existing LTE system, or any other special subframe ratio, which is not limited herein. To be specific, One manner for the synchronous base station to acquire the special subframe ratio of the synchronous source base station is that the synchronous source base station may notify the synchronous base station of the special subframe ratios configured for the synchronous source base station in a signaling manner, so that the synchronous base station may at least determine the special subframe ratio used for implementing synchronous tracking by using the GP according to received special subframe ratio information. Further, the synchronous source base station may further notify the synchronous base station of effective time of the special subframe ratios, so that the synchronous source base station acquires the effective time of different special subframe ratios. Further, the synchronous source base station may further notify the synchronous base station of use of the special subframe ratios. For example, the synchronous source base station implements non-synchronous tracking by using the GP in a special subframe in which the special subframe ratio 1 is located, and implements synchronous tracking by using the GP in a special subframe in which the special subframe ratio 2 is located. The synchronous source base station may notify a user equipment of a pattern of the special subframe ratio 1 and a position of the special subframe in which the special subframe ratio 1 is located, and may further notify the synchronous base station that the special subframe using the special subframe ratio 1 belongs to a non-synchronous tracking subframe, and the special subframe using the special subframe ratio 2 belongs to a synchronous tracking subframe. In this way, the synchronous base station may determine the special subframe ratio used by the synchronous base station at a synchronous tracking subframe moment according to a non-synchronous tracking subframe ratio of the synchronous source base station, and may further determine the special subframe ratio used by the synchronous base station at a moment of preventing synchronous tracking interference according to a synchronous tracking subframe ratio of the synchronous source base station. In addition, when the special subframe ratio is more than 1, the synchronous base station may further notify the synchronous base station of only one special subframe ratio and a GP, or DwPTS, or UpPTS ratio of one or more other special subframes.

Another manner for the synchronous base station to acquire the special subframe ratio of the synchronous source base station is that the synchronous source base station may acquire the downlink subframe of the synchronous source base station. That is, after the synchronous base station determines the synchronous source base station, the synchronous source base station may notify the synchronous base station of the downlink subframe position of the synchronous source base station in a signaling manner. That is, the synchronous base station may receive a signal position of the synchronous source base station.

Another manner for the synchronous base station to acquire the special subframe ratio of the synchronous source base station is that the synchronous base station may further acquire the special subframe ratio of the synchronous source base station, the effective time of the special subframe ratio, and the downlink subframe position in a predefined manner. To be specific, the special subframe ratio, the effective time of the special subframe ratio, and the downlink subframe position of the synchronous source base station may be acquired by acquiring the level of the synchronous source base station (any acquiring manner mentioned in the foregoing embodiments may be used as a manner for acquiring the synchronization level of the synchronous source base station), and using one-to-one correspondence between the level of the synchronous source base station and the special subframe ratio of the synchronous source base station, the effective time of the special subframe ratio, and the downlink subframe position.

It should be noted that a manner for the synchronous base station to determine the special subframe ratio may further be any combination of the foregoing manners. For example, the synchronous base station may acquire the special subframe ratio of the synchronous source base station in a signaling manner, thereby determining the special subframe ratio of the synchronous base station and afterwards determining a position of the special subframe using the special subframe ratio by using correspondence between the synchronization level of the synchronous base station and the position of the special subframe using the special subframe ratio.

It should be noted that the foregoing notified information may be notified in a manner such as radio resource control (Radio Resource Control, RRC) broadcast signaling, RRC dedicated signaling, a physical broadcast channel (Physical Broadcast Channel, PBCH), MAC signaling, physical layer signaling, or the like. Further, the signaling carrying the information may be one or more, and is not limited herein.

Step 3: The synchronous base station determines the special subframe ratio of the synchronous base station in the BCCH according to the special subframe ratio of the synchronous source base station. The special subframe ratio herein at least includes two types. Moreover, the guard periods GPs of the two special subframe ratios are different.

In the embodiment, the at least two special subframe ratios refer to the special subframe ratio at the synchronous tracking moment and the special subframe ratio at the non-synchronous tracking moment, and may further include the special subframe ratio for preventing synchronous tracking interference.

In the embodiment, one implementation manner for the synchronous base station to determine the special subframe ratio of the synchronous base station is that when the synchronous base station merely acquires one special subframe ratio of the synchronous source base station, the synchronous base station determines the special subframe ratio and the effective time synchronously tracked by the synchronous base station according to the special subframe ratio condition and the effective time of the synchronous source base station, so that the GP duration in the special subframe of the synchronous base station used at the synchronous tracking moment is larger than the GP duration in the special subframe of the synchronous source base station. Meanwhile, the synchronous base station may further determine the special subframe ratio and the effective time that are asynchronously tracked, so that the GP duration in the special subframe used at the non-synchronous tracking moment is not equal to the GP duration in the special subframe used at the synchronous tracking moment.

In the embodiment, another implementation manner for the synchronous base station to determine the special subframe ratio of the synchronous base station is that when the synchronous base station acquires more than one special subframe ratio of the synchronous source base station, the synchronous base station may further acquire the special subframe ratio and the effective time used by the synchronous source base station at the non-synchronous tracking moment, and determine the special subframe ratio and the effective time used by the synchronous base station at the synchronous tracking moment according to the acquired special subframe ratio used by the synchronous source base station at the non-synchronous tracking moment, so that the GP duration in the special subframe used by the synchronous base station at the synchronous tracking moment is larger than the GP duration in the special subframe used by the synchronous source base station when performing non-synchronous tracking. Meanwhile, the special subframe ratio and the effective time asynchronously tracked by the synchronous base station may further be determined. The GP duration in the special subframe ratio used at the non-synchronous tracking moment is not equal to the GP duration in the special subframe ratio used at the synchronous tracking moment. Optionally, the synchronous base station may further acquire the special subframe ratio and the effective time used by the synchronous source base station when performing synchronous tracking, so as to determine the special subframe ratio for preventing synchronous tracking interference and the effective time used by the synchronous base station for preventing interference when performing synchronous tracking on an upper-level synchronous source base station according to the acquired special subframe ratio and the effective time used by the synchronous source base station when performing synchronous tracking, so that the GP duration in the special subframe ratio for preventing synchronous tracking interference is no less than the GP duration in the special subframe ratio synchronously tracked by the synchronous source base station.

In the embodiment, another implementation manner for the synchronous base station to determine the special subframe ratio of the synchronous base station is that when information received by the synchronous base station is one special subframe ratio and GP ratio information of another one or more special subframes, the synchronous base station may consider that a downlink pilot time slot portion in the another one or more special subframe configuration is the same as a downlink pilot time slot portion in the one special subframe ratio by default, and afterwards determine the number of orthogonal frequency division multiplexing OFDM (Orthogonal Frequency Division Multiplexing) symbols of the another one or more special subframes used for the GP and the number of OFDM symbols used for an uplink pilot time slot according to the GP ratio information of the another one or more special subframes; or the synchronous base station may consider that an uplink pilot time slot portion in the another one or more special subframe configuration is the same as an uplink pilot time slot portion in the one special subframe ratio by default, and afterwards determine the number of orthogonal frequency division multiplexing OFDM (Orthogonal Frequency Division Multiplexing) symbols of the another one or more special subframes used for the GP and the number of OFDM symbols used for the downlink pilot time slot according to the GP ratio information of the another one or more special subframes. In addition, when the information received by the synchronous base station is one special subframe ratio and DwPTS ratio information of the another one or more special subframes, the synchronous base station may consider that the uplink pilot time slot portion in the another one or more special subframe configuration is the same as the uplink pilot time slot portion in the one special subframe ratio by default, and afterwards determine the number of orthogonal frequency division multiplexing OFDM (Orthogonal Frequency Division Multiplexing) symbols of the another one or more special subframes used for the GP according to the DwPTS ratio information of the another one or more special subframes; or when the information received by the synchronous base station is one special subframe ratio and UpPTS ratio information of the another one or more special subframes, the synchronous base station may consider that the downlink pilot time slot portion in the another one or more special subframe configuration is the same as an downlink pilot time slot portion in the one special subframe ratio by default, and afterwards determine the number of orthogonal frequency division multiplexing OFDM (Orthogonal Frequency Division Multiplexing) symbols of the one or more other special subframes used for the GP according to the UpPTS ratio information of the one or more other special subframes. So far, the synchronous base station may determine specific information of different special subframe ratios used by the synchronous source base station. Further, the synchronous base station may further determine the effective time of different special subframe ratios of the synchronous source base station. After the foregoing information is determined, one manner is that the synchronous base station may directly determine the special subframe ratio at the synchronous tracking moment and the special subframe ratio at the non-synchronous tracking moment. The GP duration used by the special subframe ratio at the synchronous tracking moment may ensure that the synchronous base station uses the GP to acquire a synchronization reference signal included in one special subframe of the synchronous source base station. The GP duration used by the special subframe ratio at the non-synchronous tracking moment is different from the GP duration used by the special subframe ratio at the synchronous tracking moment. Another manner is that the synchronous base station may further obtain use of the special subframes with different special subframe ratios of the synchronous source base station (for example, the special subframe ratio used at the synchronous tracking moment and that used at the non-synchronous tracking moment), thereby determining the special subframe ratio used by the synchronous base station at the synchronous tracking moment according to the special subframe ratio used by the synchronous source base station at the non-synchronous tracking moment, and further determining the special subframe ratio used by the synchronous base station at the non-synchronous tracking moment. The GP duration in the special subframe ratio used by the synchronous base station at the synchronous tracking moment is larger than the GP duration in the special subframe ratio used by the synchronous source base station at the non-synchronous tracking moment.

In the embodiment, another implementation manner for the synchronous base station to determine the special subframe ratio of the synchronous base station is that, after acquiring the downlink subframe of the synchronous source base station, the synchronous base station may determine the special subframe ratio and the effective time used by the synchronous base station at the synchronous tracking moment. The GP duration in the special subframe ratio used by the synchronous base station at the synchronous tracking moment may ensure that the synchronous base station can receive the synchronization reference signal of the synchronous source base station. Further, the synchronous base station may further determine the special subframe ratio and the effective time used by the synchronous base station at the non-synchronous tracking moment. The GP duration in the special subframe ratio used by the synchronous base station at the synchronous tracking moment is not equal to the GP duration in the special subframe ratio used by the synchronous source base station at the non-synchronous tracking moment.

In the embodiment, another implementation manner for the synchronous base station to determine the special subframe ratio of the synchronous base station is that the synchronous base station may acquire the special subframe ratio and the effective time used for implementing synchronous tracking by using the GP in a predefined manner. Further, the synchronous base station may further determine the special subframe ratio and the effective time used by the synchronous base station at the non-synchronous tracking moment. The GP duration in the special subframe ratio used by the synchronous base station at the synchronous tracking moment is not equal to the GP duration in the special subframe ratio used by the synchronous source base station at the non-synchronous tracking moment. A detailed process is as mentioned previously, and therefore is not described herein again.

Step 4: The synchronous base station implements synchronous tracking on the synchronization reference signal of the synchronous source base station by using the GP in the special subframe ratio at the synchronous tracking moment.

The synchronization reference signal herein may either be a common reference signal CRS (Common Reference Signal) or a channel state information reference signal CSI-RS (Channel State Information Reference Signal), and may further be a known signal acquired by any other synchronous base station such as a discovery reference signal Discovery Reference Signal (DRS) or a listening reference signal Listening Reference Signal (LRS), and may further be a signal received by a receiver channel of the synchronous base station. Further, a position, a format, and an sequence form in use of the known signal may be learnt by the synchronous base station in a network side configuration or synchronous source base station notification manner, and may further be acquired by the synchronous base station by parsing the signal of the synchronous source base station. For example, the synchronous base station may acquire cell ID information by reading a synchronization channel of the synchronous source base station, thereby learning reference signal position information of the synchronous source base station. The synchronous base station may further acquire other information such as time slot information, symbol information, and cyclic prefix CP (Cyclic Prefix) information that reconstructs the reference signal of the synchronous source base station.

Step 5: The synchronous base station notifies the user equipment of ratio patterns of at least two special subframes and/or effective time.

The synchronous base station may notify the user equipment of the ratio patterns of at least two special subframes and/or effective time of at least one special subframe in such manners as RRC broadcast signaling, RRC dedicated signaling, MAC signaling, physical layer signaling, PBCH bearing signaling, or the like. The guard period GP durations of the at least two special subframes are different.

Control information of a first special subframe in the at least two special subframes may be carried in a system information block 1; control information of a second special subframe in the at least two special subframes may be carried in the system broadcast information, the system information block 1, the radio resource control broadcast signaling, the radio resource control dedicated signaling, the media access control signaling, the PBCH, or the physical layer signaling.

The special subframe ratio patterns herein may be the number of OFDM symbols occupied by DwPTS and/or the number of OFDM symbols occupied by the guard period GP and/or the number of OFDM symbols occupied by UpPTS. The effective time further includes: the special subframe position information. Further, the special subframe position information may be represented by using a special subframe offset and period. The period may either be the BCCH modification period or a special subframe presence period.

Figure 6:
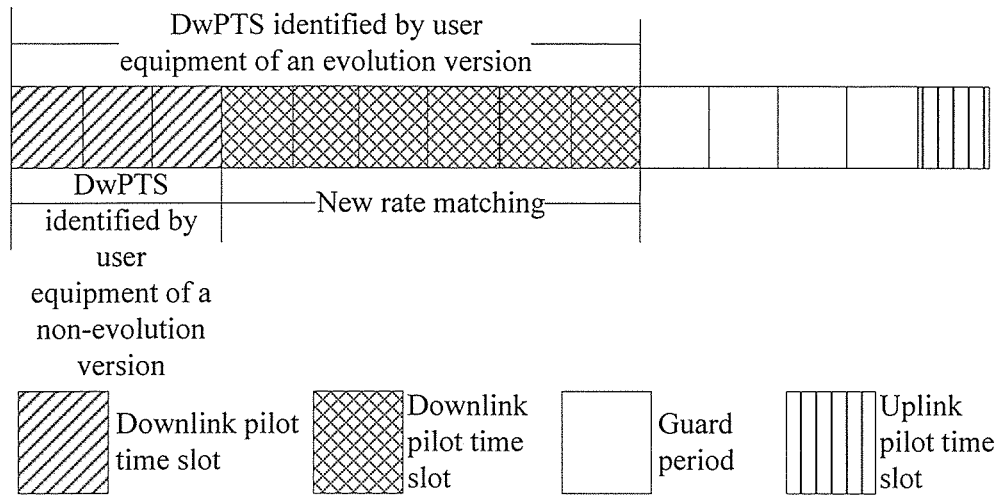
FIG. 6 is a schematic diagram of a DwPTS identified by a user equipment and implemented according to an embodiment of the present invention.

Further, a user equipment of a non-evolution version such as a user equipment UE (User Equipment) of Release 8/9/10/11, may merely identify the special subframe ratio with a larger GP in the at least two special subframe ratios, so as not to affect a measurement system of the UE. That is, the synchronous base station may merely notify, the user equipment of the non-evolution version, of the special subframe ratio with a largest GP. For example, the synchronous base station may notify, the user equipment of the non-evolution version, special subframe ratio information not affecting UE measurement by using SIB1 information. The user equipment of the non-evolution version may further consider effective time of the special subframe ratio information not affecting the UE measurement is each special subframe position by default. In another aspect, for a user equipment of an evolution version such as a user equipment of Release 12, the synchronous base station may notify, the user equipment of the evolution version, of the at least two special subframe ratios and/or the effective one of one special subframe ratio. For example, the synchronous base station may notify, the user equipment of the evolution version, of a first special subframe ratio by using the SIB1 information, and notify, the user equipment of the evolution version, of a second special subframe ratio by using the SIB1 information, RRC broadcast signaling, RRC dedicated signaling, PBCH bearing signaling, MAC signaling, or physical layer signaling. It should be noted that information about the second special subframe ratio is merely identified by partial user equipment served by the synchronous base station, for example, merely identified by the user equipment of the evolution version. After acquiring the information, the user equipment of the evolution version may determine different special subframe ratios used by the synchronous base station at different special subframe positions. For example, the user equipment of the evolution version may consider using one special subframe ratio in the effective time of the one special subframe ratio, and using other special subframe ratios different from the one special subframe ratio at other special subframe presence positions. By far, the user equipment of the evolution version may acquire the number of OFDM symbols occupied by DwPTS, the number of OFDM symbols occupied by the guard period GP, and the number of OFDM symbols occupied by UpPTS at each special subframe position, thereby performing correct data receiving and/or data demodulation and/or channel quality measurement. When the synchronous base station allocates a same data resource such as one or more physical resource blocks PRB (Physical Resource Block) for the user equipment of the non-evolution version and the user equipment of the evolution version, since the number of OFDM symbols occupied by DwPTS in at least one special subframe identified by the user equipment of the non-evolution version and that identified by the user equipment of the evolution version are different, as shown in FIG. 6, the user equipment of the evolution version further needs to learn rate matching information corresponding to a "new rate matching" portion in FIG. 6, so that the user equipment of the evolution version may implement data modulation correctly.

Further, the user equipment of the evolution version may further include access equipment that implements at least one of the following functions by receiving a radio signal: synchronous tracking, carrier selection, equipment discovery, and interference information learning.

It should be noted that the foregoing steps merely illustrate contents included in determining the at least two special subframe ratios by the synchronous base station, and do not represent a sequence.

Embodiment 4

This embodiment provides an implementation manner for a first device to transmit control information to a second device. The implementation manner may either be used alone, or be used as an implementation manner that "a first device transmits control information to a second device", and jointly used with each embodiment in the present invention.

A synchronous source base station may notify a synchronous base station of a special subframe ratio in a signaling manner. The synchronous source base station may further notify a user equipment of the special subframe ratio. Further, the synchronous base station may further notify, the user equipment or any other synchronous base station that uses the synchronous base station as a synchronous source base station, of ratio patterns of at least two special subframes and/or effective time of one special subframe.

Control information of a first special subframe in the at least two special subframes may be carried in a system information block 1; control information of a second special subframe in the at least two special subframes may be carried in system broadcast information, the system information block 1, radio resource control broadcast signaling, radio resource control dedicated signaling, media access control signaling, a PBCH, or physical layer signaling.

Contents of the signaling herein may include the ratio patterns of at least two special subframes and/or the effective time of the one special subframe. The special subframe ratio patterns herein may be the number of OFDM symbols occupied by DwPTS and/or the number of OFDM symbols occupied by a guard period GP, and/or the number of OFDM symbols occupied by UpPTS. The effective time may include: special subframe position information. Further, the special subframe position information may be represented by using a special subframe offset and period. The period may either be a BCCH modification period or a special subframe presence period, and may further be a time duration not equal to a product of modificationPeriodCoeff and defaultPagingCycle. In the period, a TDD uplink downlink subframe ratio remains unchanged. The contents may either be carried in the same or different signaling. The special subframe ratio patterns may be notified in the following manners.

Manner 1: Import signaling is extended in current system information carrying the special subframe ratio, so as to indicate the special subframe ratio. For example, spare may be one or more, which is not limited herein.

TDD-Config Information Element

```
-- ASN1START
TDD-Config ::=           SEQUENCE {
    subframeAssignment       ENUMERATED {
                                sa0, sa1, sa2, sa3, sa4, sa5,
                                sa6},
    specialSubframePatterns  ENUMERATED {
                                ssp0, ssp1, ssp2, ssp3,
                                ssp4,ssp5, ssp6, ssp7, ssp8}
    specialSubframePatterns-new ENUMERATED {
                                ssp0, ssp1, ssp2, ssp3,
                                ssp4,ssp5, ssp6, ssp7,
                                ssp8,spare }
}
-- ASN1STOP
``` specialSubframePatterns-new is newly imported signaling. In view of backward compatibility of a UE of a non-evolution version, a special subframe ratio that does not affect the backward compatibility of the UE of the non-evolution version, such as a special subframe ratio with a relatively large GP (for example, it may be a special subframe ratio at a synchronous tracking moment) may be represented by using an original special subframe ratio indication signaling specialSubframePatterns. A special subframe ratio that may affect the backward compatibility of the UE of the non-evolution version, such as a special subframe ratio with a relatively small GP (for example, it may be a special subframe ratio at a non-synchronous tracking moment) is indicated by using the newly imported special subframe ratio indication signaling. Further, the newly imported special subframe ratio indication signaling (such as the specialSubframePatterns-new) may further be carried in other signaling. For example, the specialSubframePatterns-new may be indicated by using redundant bits in a PBCH or PDCCH, or MAC signaling, and may further be indicated by importing new RRC dedicated signaling or RRC broadcast signaling. In addition, a type of special subframe ratio signaling may further be imported so as to indicate a special subframe ratio for preventing synchronous tracking interference. When the user equipment learns the information, the special subframe ratio pattern used in a system may be directly determined.

Manner 2: Import signaling is extended in current system information carrying the special subframe ratio, so as to indicate a GP ratio. For example, spare may be one or more, which is not limited herein.

TDD-Config Information Element

```
-- ASN1START
TDD-Config ::=           SEQUENCE {
    subframeAssignment       ENUMERATED {
                                sa0, sa1, sa2, sa3, sa4,
                                sa5, sa6},
    specialSubframePatterns  ENUMERATED {
                                ssp0, ssp1, ssp2, ssp3,
                                ssp4,ssp5, ssp6, ssp7, ssp8}
    GPPatterns-new           ENUMERATED {
                                gpp0, gpp1, gpp2, gpp3,
                                gpp4,spare}}
}
-- ASN1STOP
```

Alternatively, import signaling may further be extended in current system information carrying the special subframe ratio, so as to indicate a DwPTS ratio. For example, spare may be one or more, which is not limited herein.

TDD-Config Information Element

```
-- ASN1START
TDD-Config ::=           SEQUENCE {
    subframeAssignment       ENUMERATED {
                                sa0, sa1, sa2, sa3, sa4, sa5, sa6},
    specialSubframePatterns  ENUMERATED {
                                ssp0, ssp1, ssp2, ssp3, ssp4,ssp5,
                                ssp6, ssp7, ssp8}
    DwPTSPatterns-new        ENUMERATED {
                                DwPTSp0, DwPTSp1, DwPTSp2,
                                DwPTSp3,
DwPTSp4, spare }
}
-- ASN1STOP
```

Alternatively, import signaling may further be extended in current system information carrying the special subframe ratio, so as to indicate a UpPTS ratio. For example, spare may be one or more, which is not limited herein.

TDD-Config Information Element

```
-- ASN1START
TDD-Config ::=              SEQUENCE {
    subframeAssignment          ENUMERATED {
                                    sa0, sa1, sa2, sa3, sa4, sa5, sa6},
    specialSubframePatterns     ENUMERATED {
                                    ssp0, ssp1, ssp2, ssp3, ssp4,ssp5,
                                    ssp6, ssp7, ssp8}
    UpPTSPatterns-new           ENUMERATED {
                                    UpPTSp0, UpPTSp1, spare }
}
-- ASN1STOP
```

Similarly, the newly imported GP or DwPTS or UpPTS ratio signaling may further be carried in other signaling. For example, the GP or DwPTS or UpPTS ratio may be indicated by using redundant bits in a PBCH or PDCCH, or MAC signaling. Moreover, the GP or DwPTS or UpPTS ratio may further be indicated by importing new RRC dedicated signaling or RRC broadcast signaling. In addition, GP or DwPTS or UpPTS ratio signaling may further be imported so as to indicate a special subframe ratio for preventing synchronous tracking interference. When learning GP ratio information, the user equipment may determine a special subframe ratio pattern by using the original special subframe ratio indication signaling specialSubframePatterns, consider that the number of OFDM symbols occupied by DwPTS or UpPTS in another special subframe ratio pattern and the number of OFDM symbols occupied by DwPTS or UpPTS in the special subframe ratio pattern indicated by the specialSubframePatterns are the same by default, and determine the number of OFDM symbols occupied by UpPTS or DwPTS in another special subframe ratio pattern according to the GP ratio information. When the user equipment learns DwPTS or UpPTS ratio information, the user equipment may firstly use the original special subframe ratio indication signaling specialSubframePatterns to learn a special subframe ratio pattern, and consider that the number of OFDM symbols occupied by UpPTS or DwPTS in another special subframe ratio pattern and the number of OFDM symbols occupied by UpPTS or DwPTS in the special subframe ratio pattern indicated by the specialSubframePatterns are the same by default, and determine the number of OFDM symbols occupied by GP in another special subframe ratio pattern according to the DwPTS or UpPTS ratio information. The foregoing process is also applicable to a scenario that three special subframe ratio patterns exist in a system, and thereby is not described herein again.

Meanwhile, the effective time of each special subframe ratio is indicated by importing other signaling. The other signaling may be RRC dedicated signaling, RRC broadcast signaling, PBCH bearing information, MAC signaling, or physical layer signaling. The effective time herein may include special subframe position information. Further, the special subframe position information may be represented by using special subframe position offset information offset and period. The period herein may either be the BCCH modification period or the special subframe presence period. In the period, the TDD uplink downlink subframe ratio may remain unchanged. For ease of description, the period is represented by period. The period and the offset herein may be represented by the number of symbols, the number of subframes, or the number of radio frames. For example, when the period is represented by the number of radio frames, a radio frame number satisfying a following formula "radio frame number mod period=offset" may be determined firstly, thereby determining a radio frame position at which a special subframe using the special subframe ratio is located. Other control information is further used to determine a position of the special subframe using the special subframe ratio in a predefined, bitmap or bit binary manner. For example, the user equipment is notified of the following information by using system broadcast information. After receiving the information, the user equipment firstly determines a radio frame number satisfying a formula "radio frame number mod 8=2", thereby determining that the radio frame position at which the special subframe using the special subframe ratio is located may be a radio frame #2. A second special subframe (that is, corresponding to a special subframe #6) in the radio frame #2 is determined by using Specialsubframepattern1A1position information. A special subframe ratio 1 is used.

```
-- ASN1START
Special subframe effective time::=      SEQUENCE {
    Period              ENUMERATED { n8},
    Offset              INTEGER (2),
    Specialsubframepattern1A1position       (01)
}
-- ASN1STOP
```

For another example, signaling may be imported to indicate that the effective time of one special subframe ratio is 16. After receiving the information, the user equipment may use a 16-to-10 mod value (that is 1) to firstly determine that an effective radio frame number of the one special subframe ratio is 1, and then use a 16-to-10 REM result (that is 6) to determine that a subframe 6 in the radio frame number 1 uses the special subframe ratio.

Optionally, it can be considered that other different special subframe ratios are used in other special subframes in the period not meeting the foregoing formula, or another signaling is imported to indicate effective time of other different special subframe ratios. The signaling herein may be RRC dedicated signaling, RRC broadcast signaling, PBCH bearing information, or MAC signaling.

In addition, another signaling implementation manner for carrying the special subframe effective time is: importing trigger signaling. The trigger signaling may be MAC signaling or physical layer signaling (for example, represented by redundant bits in a PDCCH). The user equipment may consider a special subframe ratio 1 or a special subframe ratio 2 is used in a subframe notified by the trigger signaling, and the special subframe ratio 2 or the special subframe ratio 1 is used in a subframe not notified by the trigger signaling. Optionally, the user equipment may further consider the special subframe ratio 1, the special subframe ratio 2, or a special subframe 3 is used in the subframe notified by the trigger signaling. To be specific, two states of 1 bit may be used to indicate a current ratio pattern of the special subframe. For example, 0 represents that the special subframe ratio 1 is used and 1 represents that the special subframe ratio 2 is used. Moreover, four states of 2 bit may further be used to indicate the ratio pattern used by the current special subframe. For example, 00/01/10 may separately represent that the special subframe ratio 1/the special subframe ratio 2/the special subframe ratio 3 is used, or a bitmap form is used to indicate the currently used ratio pattern of the special subframe. For example, 001/010/100 may separately represent that the special subframe ratio 1/the special subframe ratio 2/the special subframe ratio 3 is used.

Optionally, in addition to using the manner of notifying in the foregoing signaling manner to enable the second device to learn special subframe configuration information of the first device, the special subframe configuration information of the first device may further be learnt in a predefined manner, especially when the second device is another base station rather than the user equipment. The special subframe ratio information herein includes the special subframe ratio pattern/and or special subframe effective time, and reference may be made to the foregoing embodiments for a specific manner, which is not described herein again.

Embodiment 5

An embodiment of the present invention provides a method for generating a subframe, including:

determining, by a first device, patterns of at least two special subframes used in a broadcast control channel modification period, where guard period GP initial positions of the at least two special subframes are different; and generating, by the first device, the at least two special subframes.

Preferably, after the step of "a first device determines patterns of at least two special subframes used in a broadcast control channel modification period, where guard period GP initial positions of the at least two special subframes are different", the first device generates control information used to indicate the at least two special subframes and transmits the control information to a second device.

Optionally, the control information includes: ratio patterns of the at least two special subframes and/or special subframe effective time.

Preferably, the special subframe effective time includes: a special subframe position; or, a special subframe offset and period.

Preferably, in a preferred implementation manner of the embodiment of the present invention, after the step "the first device generates the at least two special subframes", the first device receives a signal by using a GP of a first special subframe in the at least two special subframes and transmits the signal by using a downlink pilot time slot in the first special subframe.

In another preferred implementation manner of the embodiment of the present invention, after the first device receives the signal by using the GP of the first special subframe in the at least two special subframes, the first device implements synchronous tracking, energy detection and/or signal parsing by using the received signal.

In another preferred implementation manner of the embodiment of the present invention, that the first device receives the signal by using the GP of the first special subframe in the at least two special subframes includes: receiving, by the first device, a synchronization signal by using the GP of the first special subframe; and transmitting, by the first device, the synchronization signal to a lower-level device by using a downlink subframe and/or a second special subframe in the at least two special subframes, where the GP duration initial position of the first special subframe and the GP duration initial position of the second special subframe are different.

Preferably, the step "a first device determines patterns of at least two special subframes used in a broadcast control channel modification period, where guard period GP initial positions of the at least two special subframes are different" may be implemented in at least one of the following manners:

Manner 1: The first device receives first indication information transmitted by a third device. The first indication information is used to indicate a special subframe used by the third device. The first device determines the patterns of the at least two special subframes according to the first indication information.

Preferably, that the first device determines the patterns of the at least two special subframes according to the first indication information includes: determining, by the first device, the special subframe used by the third device according to the first indication information; determining, by the first device, a pattern of the first special subframe in the at least two special subframes, where a GP initial position of the first special subframe is in a DWPTS of the special subframe or a downlink subframe used by the third device; determining, by the first device, patterns of other special subframes except the first special subframe in the at least two special subframes, where a GP initial position of at least one special subframe in the other special subframes is different from the GP initial position of the first special subframe.

Manner 2: The first device determines the patterns of the at least two special subframes used in the broadcast control channel modification period according to correspondence between a level of the first device and the patterns of the at least two special subframes. The correspondence may be one-to-one correspondence, one-to-many correspondence, or many-to-one correspondence. The correspondence may either be represented by a correspondence table or by a certain function relationship.

Preferably, that the first device determines the patterns of the at least two special subframes used in the broadcast control channel modification period includes: determining, by the first device, the patterns of the at least two special subframes used in a first time period in the broadcast control channel modification period. The first time period is a time period of a same uplink downlink subframe ratio. A determining manner may be either of the foregoing manners 1 to 2.

Optionally, the second device includes a user equipment, and/or, the first device includes a base station.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

An embodiment of the present invention provide a method for determining a subframe, including:

receiving, by a user equipment, control information transmitted by a first device, where the control information is used to indicate at least two special subframes used by the first device in a broadcast control channel modification period, and guard period GP initial positions of the at least two special subframes are different; and determining, by the user equipment, the at least two special subframes according to the control information.

Optionally, the control information includes: ratio patterns of the at least two special subframes and/or special subframe effective time.

Optionally, the special subframe effective time includes: a special subframe position; or, a special subframe offset and period.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

The following describes an implementation process of the embodiment of the present invention with reference to the specific embodiment.

An embodiment of the prevent invention provides an implementation manner that the first device determines the patterns of the at least two special subframes used in the broadcast control channel modification period, where the guard period GP initial positions of the at least two special subframes are different. The different GP initial positions herein refer to different numbers of initial GP OFDM symbols. For example, a GP of one special subframe takes an $x_{th}$ OFDM symbol as an initial position in one subframe, and a GP of another special subframe takes a $y_{th}$ OFDM symbol as an initial position in another special subframe, where x and y are not equal. Moreover, x and y represent an index number of an OFDM symbol in one subframe (for example, x and y represent 0-13 or 1-14 for a system with a normal cyclic prefix). It should be noted that by replacing "different GP durations" in other embodiments of the present invention into "different GP initial positions", relevant contents of the embodiment may be described.

The embodiment may either be used alone, or used as an implementation manner for that "the first device determines patterns of at least two special subframes used in a broadcast control channel modification period, where guard period GP durations of the at least two special subframes are different", and jointly used with each embodiment in the present invention.

Figure 7:
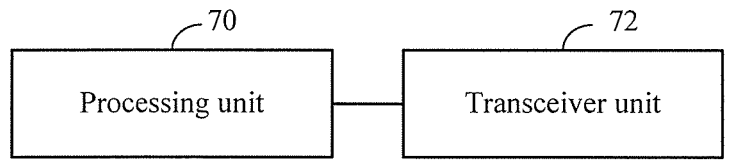
FIG. 7 is a structural block diagram of a device for generating a subframe according to an embodiment of the present invention.

An embodiment of the present invention further provides a device for generating a subframe. The device may be the first device in the foregoing embodiments. Therefore, features of the first device in the foregoing method embodiments may be used in the embodiment. As shown in FIG. 7, the device for generating a subframe includes: a processing unit 70 and a transceiver unit 72. The processing unit 70 is configured to determine patterns of at least two special subframes used in a broadcast control channel modification period; guard period GP durations of the at least two special subframes are different; and the processing unit 70 is further configured to generate the at least two special subframes.

Preferably, the transceiver unit 72 is configured to receive and transmit signals.

Optionally, after determining the patterns of the at least two special subframes used in the broadcast control channel modification period, the processing unit 70 is further configured to generate control information used to indicate the at least two special subframes. The transceiver unit 72 is further configured to transmit the control information to a second device.

Preferably, the control information includes: ratio patterns of the at least two special subframes and/or special subframe effective time.

Optionally, the special subframe effective time includes: a special subframe position; or, a special subframe offset and period.

In a preferred implementation manner of the embodiment of the present invention, the transceiver unit 72 is further configured to receive a signal by using a GP of a first special subframe in the at least two special subframes, and transmit a signal by using a downlink pilot time slot in the first special subframe.

In another preferred implementation manner of the embodiments of the present invention, after receiving the signal by using the GP of the first special subframe in the at least two special subframes, the processing unit 70 is further configured to perform synchronous tracking and/or energy detection by using the received signal.

Optionally, that the transceiver unit 72 is configured to receive a signal by using a GP of a first special subframe in the at least two special subframes includes: receiving a synchronization signal by using the GP of the first special subframe. The transceiver unit 72 is further configured to transmit the synchronization signal to a lower-level device by using a second special subframe in the at least two special subframes, where the GP duration of the first special subframe is larger than a GP duration of the second special subframe.

Optionally, the transceiver unit 72 is further configured to receive first indication information transmitted by a third device, where the first indication information is used to indicate a special subframe used by the third device. The processing unit 70 is configured to determine the patterns of the at least two special subframes according to the first indication information.

Preferably, the processing unit 70 is configured to determine the special subframe used by the third device according to the first indication information. The processing unit 70 is configured to determine a pattern of the first special subframe in the at least two special subframes, where the GP duration of the first special subframe is larger than a GP duration of the special subframe used by the third device. The processing unit 70 is configured to determine patterns of other special subframes except the first special subframe in the at least two special subframes, where a GP duration of at least one special subframe in the other special subframes is different from the GP duration of the first special subframe.

Preferably, that the processing unit 70 is configured to determine patterns of at least two special subframes used in a broadcast control channel modification period includes: determining, by the processing unit 70, the patterns of the at least two special subframes used in the broadcast control channel modification period according to correspondence between a level of the first device and the patterns of the at least two special subframes.

Preferably, the transceiver unit 72 is further configured to receive second indication information transmitted by a third device, where the second indication information is used to indicate a downlink subframe used by the third device. The processing unit 70 is configured to determine the patterns of the at least two special subframes according to the second indication information.

Optionally, that the processing unit 70 is configured to determine the patterns of the at least two special subframes according to the second indication information includes: the processing unit 70 is configured to determine the downlink subframe used by the third device according to the second indication information; the processing unit 70 is configured to determine a pattern of the first special subframe in the at least two special subframes, where the GP of a determined GP of the special subframe is corresponding to a position of the downlink subframe used by the third device; the processing unit 70 is configured to determine patterns of other special subframes except the first special subframe in the at least two special subframes, where a GP duration of at least one special subframe in the other special subframes is different from the GP duration of the first special subframe.

Optionally, that the processing unit 70 is configured to determine patterns of at least two special subframes used in a broadcast control channel modification period includes:

the processing unit 70 determines the patterns of the at least two special subframes used in a first time period in the broadcast control channel modification period, where the first time period is a time period of a same uplink downlink subframe ratio.

Optionally, the second device includes a user equipment, and/or, the first device includes a base station.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

Figure 8:
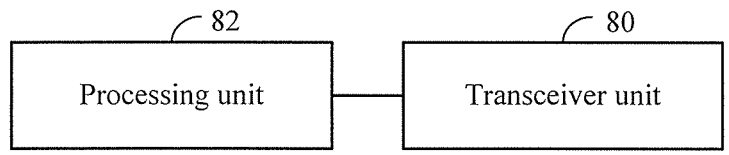
FIG. 8 is a structural block diagram of a user equipment according to an embodiment of the present invention.

An embodiment of the present invention further provides a user equipment. The user equipment may implement the foregoing method embodiments. As shown in FIG. 8, the user equipment includes: a transceiver unit 80, configured to receive control information transmitted by a first device, where the control information is used to indicate at least two special subframes used by the first device in a broadcast control channel modification period, and guard period GP durations of the at least two special subframes are different; and a processing unit 82, configured to determine patterns of the at least two special subframes according to the first indication information.

Preferably, the control information includes: ratio patterns of the at least two special subframes and/or special subframe effective time.

Optionally, the special subframe effective time includes: a special subframe position; or, a special subframe offset and period.

Preferably, control information of a first special subframe in the at least two special subframes is carried in a system information block 1; control information of a second special subframe in the at least two special subframes is carried in the system information block 1, radio resource control broadcast signaling, radio resource control dedicated signaling, media access control signaling, or physical layer signaling.

Figure 9:
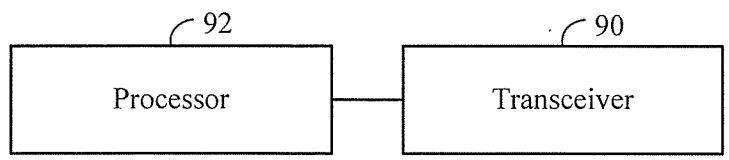
FIG. 9 is a structural block diagram of another device for generating a subframe according to an embodiment of the present invention.

As shown in FIG. 9, an embodiment of the present invention further provides a device for generating a subframe. The device for generating a subframe includes a transceiver 90 and a processor 92. The transceiver 90 may be configured to implement functions of a transceiver unit 72 and the processor 92 may be configured to implement functions of a processing unit 70.

Figure 10:
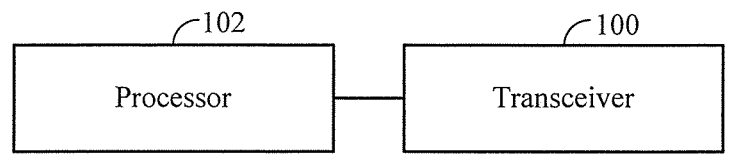
FIG. 10 is a structural block diagram of another user equipment according to an embodiment of the present invention.

An embodiment of the present invention further provides a user equipment. The user equipment may implement the foregoing method embodiment. As shown in FIG. 10, the user equipment includes a transceiver 100 and a processor 102. The transceiver 100 may be configured to implement functions of a transceiver unit 80 and the processor 102 may be configured to implement functions of a processing unit 82.

An embodiment of the present invention further provides a system. The system includes the device for generating a subframe in the foregoing embodiments and the user equipment in the foregoing embodiments.

An embodiment of the present invention further provides a system. The system includes the device for generating a subframe in the foregoing embodiments and the second device in the foregoing embodiments.

The processor in the foregoing embodiments of the present invention may be a baseband processor, and may further be an integrated circuit chip with a signal processing capacity, and may further be a hardware processor such as a central processing unit (Central Processing Unit, CPU for short), or the like. During an implementation process, each step of the foregoing methods may be completed by using an integrated logic circuit of hardware in the processor or instructions of a hardware form. The instructions may be cooperatively implemented and controlled by using the processor therein. The instructions are used to execute the method disclosed by the present invention. The foregoing processor may be a general processor, a digital signal processor (Digital Signal Processor, DSP for short), an application specific integrated circuit (Application Specific Integrated Circuit, ASIC for short), a field programmable gate array (Field Programmable Gate Array, FPGA for short), or other programmable logic device, discrete gate or transistor logic device, or discrete hardware component. The processor may execute each method, step, and logic block diagram disclosed in the embodiments of the present invention. The general processor may be a microprocessor or the processor may be any conventional processor and decoder, or the like. With reference to the steps of the methods disclosed by the embodiments of the present invention, it may be directly represented that the steps are executed and completed by the hardware processor, or executed and completed by a combination of the hardware and a software module in the processor. The software module may be located in a mature storage medium in the art such as a random memory, a flash memory, a read-only memory, a programmable read-only memory, or an electrically erasable programmable read-only memory, a register, or the like.

Through the descriptions of the foregoing embodiments, it may be clearly understood by a person skilled in the art that the present invention may be implemented by hardware or firmware, or a combination manner of the hardware and the firmware. When software is used for implementation, the foregoing functions may be stored in a computer-readable medium or be served as one or more pieces of instructions or code on the computer-readable medium to perform transmission. The computer-readable medium includes a computer storage medium and a communication medium. The communication medium includes any medium that is convenient to transmit a computer program from one place to another place. The storage medium may be any available medium that can be stored by a computer. Taking this for example: the computer-readable medium may include but is not limited to: a random access memory (Random Access Memory, RAM for short), a read-only memory (Read-Only Memory, ROM for short), an electrically erasable programmable read-only memory (Electrically Erasable Programmable Read-Only Memory, CD-ROM for short) or other compact disc and disk storage mediums or other disk storage devices, or any other medium that can be used to carry or store expected program code with an instruction or data structure model, and can be stored by the computer. In addition, any connection may properly become a computer-readable medium. For example, if the software is remotely transmitted from a website, a server or other remote source through a coaxial cable, an optical fiber cable, a twisted pair and a digital subscriber line (Digital Subscriber Line, DSL for short) or a radio technology such as infrared ray, radio and microwave, or the like, the coaxial cable, the optical fiber cable, the twisted pair, the DSL or the radio technology such as the infrared ray, the radio and the microwave, or the like, are included in a fixation image of an affiliated medium.

For example, a disk (Disk) and a disc (disc) used in the present invention includes a compact disc (Compact Disc, CD for short), a laser disc, an optical disc, a digital versatile disk (Digital Versatile Disk, DVD for short), a diskette and a blue-ray disc. The disk generally copies data magnetically. The disc is used to copy data optically through laser. Combinations of the above shall also fall within the protection scope of the computer-readable medium.

In short, the foregoing descriptions are merely preferred embodiments of the present invention, but are not intended to limit the protection scope of the present invention. Any variation, equivalent replacement and improvement made within the sprits and principles of the present invention shall fall within the protection scope of the present invention.

What is claimed is:

1. A device for generating a subframe, the device comprising:
   a transceiver configured to receive first indication information transmitted by a first device, wherein the first indication information is used to indicate a special subframe used by the first device; and
   a processor configured to:
      determine the special subframe used by the first device according to the first indication information;
      determine a pattern of a first special subframe among at least two special subframes used in a broadcast control channel modification period, wherein a guard period (GP) duration of the first special subframe is larger than a GP duration of the special subframe used by the first device;
      determine patterns of other special subframes except the first special subframe among the at least two special subframes, wherein a GP duration of at least one special subframe in the other special subframes is different from the GP duration of the first special subframe; and
      generate the at least two special subframes.

2. The device according to claim 1, wherein:
   after determining the patterns of the at least two special subframes used in the broadcast control channel modification period, the processor is further configured to generate control information used to indicate the at least two special subframes; and
   the transceiver is further configured to transmit the control information to a second device.

3. The device according to claim 2, wherein the control information comprises at least one of: ratio patterns of the at least two special subframes, and a special subframe effective time.

4. The device according to claim 3, wherein the special subframe effective time comprises:
   a special subframe position; or
   a special subframe offset and period.

5. The device according to claim 1, wherein the transceiver is further configured to:
   use a GP of the first special subframe to receive a signal, and use a downlink pilot time slot in the first special subframe to transmit the signal.

6. The device according to claim 5, wherein after using the GP of the first special subframe to receive the signal, the processor is further configured to:
   use the received signal to perform at least one of: synchronous tracking, and energy detection.

7. The device according to claim 5, wherein the transceiver is further configured to:
   use the GP of the first special subframe to receive a synchronization signal; and
   transmit the synchronization signal to a lower-level device by using a second special subframe among the at least two special subframes, wherein the GP duration of the first special subframe is larger than a GP duration of the second special subframe.

8. The device according to claim 1, wherein the processor is further configured to:
   determine the patterns of the at least two special subframes used in the broadcast control channel modification period according to correspondence between a level of the device and the patterns of the at least two special subframes.

9. The device according to claim 1, wherein:
   the transceiver is configured to receive second indication information transmitted by the first device, wherein the second indication information is used to indicate a downlink subframe used by the first device; and
   the processor is configured to determine the patterns of the at least two special subframes according to the second indication information.

10. The device according to claim 9, wherein the processor is configured to:
    determine the downlink subframe used by the first device according to the second indication information;
    determine a pattern of the first special subframe, wherein a determined GP duration of a special subframe corresponds to a position of the downlink subframe used by the first device; and
    determine patterns of other special subframes except the first special subframe among the at least two special subframes, wherein a GP duration of at least one special subframe in the other special subframes is different from the GP duration of the first special subframe.

11. A method for generating a subframe, the method comprising:
    receiving, by a first device, first indication information transmitted by a second device, wherein the first indication information is used to indicate a special subframe used by the second device;
    determining, by the first device, the special subframe used by the second device according to the first indication information;
    determining, by the first device, a pattern of a first special subframe among at least two special subframes used in a broadcast control channel modification period, wherein a guard period (GP) duration of the first special subframes is larger than a GP duration of the special subframe used by the second device;
    determining patterns of other special subframes except the first special subframe among the at least two special subframes, wherein a GP duration of at least one special subframe in the other special subframes is different from the GP duration of the first special subframe; and
    generating, by the first device, the at least two special subframes.

12. The method according to claim 11, wherein after determining, by the first device, patterns of the at least two special subframes used in the broadcast control channel modification period, the method further comprises:
    generating, by the first device, control information used to indicate the at least two special subframes; and
    transmitting, by the first device, the control information to a third device.

13. The method according to claim 12, wherein the control information comprises at least one of: ratio patterns of the at least two special subframes, and a special subframe effective time.

14. The method according to claim 11, wherein after generating, by the first device, the at least two special subframes, the method further comprises:
receiving, by the first device, a signal by using a GP of the first special subframe, and transmitting the signal by using a downlink pilot time slot in the first special subframe to transmit the signal.

15. The method according to claim 14, wherein after receiving, by the first device, the signal by using the GP of the first special subframe, the method further comprises:
performing, by the first device, at least one of: synchronous tracking, energy detection, and signal parsing by using the received signal.

16. The method according to claim 14, wherein receiving, by the first device, the signal by using the GP of the first special subframe comprises:
receiving, by the first device, a synchronization signal by using the GP of the first special subframe; and
transmitting, by the first device, the synchronization signal to a lower-level device by using at least one of a downlink subframe and a second special subframe among the at least two special subframes, wherein the GP duration of the first special subframe is larger than a GP duration of the second special subframe.

* * * * *